US012602606B2

(12) United States Patent
Chernoguzov et al.

(10) Patent No.: US 12,602,606 B2
(45) Date of Patent: Apr. 14, 2026

(54) APPARATUSES, COMPUTER-IMPLEMENTED METHODS, AND COMPUTER PROGRAM PRODUCTS FOR IMPROVED GLOBAL QUBIT POSITIONING IN A QUANTUM COMPUTING ENVIRONMENT

(71) Applicant: Quantinuum LLC, Broomfield, CO (US)

(72) Inventors: Alexander Chernoguzov, Warrington, PA (US); Stephen James Ragole, Charlotte, NC (US); Megan Lynn Kohagen, Robbinsdale, MN (US); David Hayes, Broomfield, CO (US); Ian Mark Hoffman, Arvada, CO (US)

(73) Assignee: Quantinuum LLC, Broomfield, CO (US)

( * ) Notice: Subject to any disclaimer, the term of this patent is extended or adjusted under 35 U.S.C. 154(b) by 1329 days.

(21) Appl. No.: 17/358,891

(22) Filed: Jun. 25, 2021

(65) Prior Publication Data

US 2022/0414507 A1     Dec. 29, 2022

(51) Int. Cl.
*G06N 10/60*          (2022.01)
(52) U.S. Cl.
CPC .................................. *G06N 10/60* (2022.01)
(58) Field of Classification Search
CPC ......... G06N 10/60; G06N 10/40; G06N 10/20
See application file for complete search history.

(56) References Cited

U.S. PATENT DOCUMENTS

2020/0125985 A1 * 4/2020 Narang .................. G06N 10/60
2023/0401471 A1 * 12/2023 Singh ..................... H04L 9/0855
2024/0005190 A1 * 1/2024 Kong ..................... G06N 10/20

OTHER PUBLICATIONS

Baker, Jonathan M., et al. "Time-sliced quantum circuit partitioning for modular architectures." Proceedings of the 17th ACM International Conference on Computing Frontiers. 2020. (Year: 2020).*
Siraichi, Marcos Yukio, et al. "Qubit allocation." Proceedings of the 2018 international symposium on code generation and optimization. 2018. (Year: 2018).*

* cited by examiner

*Primary Examiner* — Sehwan Kim
(74) *Attorney, Agent, or Firm* — Alston & Bird LLP

(57)          ABSTRACT

Embodiments of the present disclosure provide for efficient global qubit placement within a quantum computing environment for a quantum program. Some embodiments utilize a graph-based approach to represent positions in a quantum computing environment, and optimize the graph layout using a graph processing algorithm to rearrange layers of a graph and reduce edge crossings. A layered graph associated with minimum cost is selected and utilized as an efficient layered graph for purposes of global qubit placement at various time steps of execution. Embodiments provide satisfactory approximations that avoid the NP-hard nature of this task to significantly reduce compilation time to a solution for global qubit placement as opposed to optimal global qubit placement while additionally identifying solutions that significantly reduce overall execution time and computing resource usage.

20 Claims, 15 Drawing Sheets

$$P_0 = \frac{0+1}{2} = 0.5$$

$$P_1 = \frac{2}{1} = 2$$

$$P_2 = \frac{0+1}{2} = 0.5$$

APPARATUSES, COMPUTER-IMPLEMENTED METHODS, AND COMPUTER PROGRAM PRODUCTS FOR IMPROVED GLOBAL QUBIT POSITIONING IN A QUANTUM COMPUTING ENVIRONMENT

TECHNOLOGICAL FIELD

Embodiments of the present disclosure generally relate to instruction compilation for qubit placement in a quantum computing environment, and specifically to improving global qubit placement to achieve execution of large-depth quantum programs.

BACKGROUND

To effectuate quantum computing (e.g., execution of quantum programs) using a quantum charge-coupled device ("QCCD") architecture, qubits are positioned and repositioned in a quantum computing environment to enable such qubits to be read and utilized for performing logical operations. Poor qubit placement can increase the complexity of executing a particular quantum program (e.g., increase execution time and quantum computing resources required). Optimized placement of qubits, however, is conventionally computationally expensive or practically impossible due to time complexity in a conventional computing environment for identifying the optimal global placement of qubits to perform the quantum program. Applicant has discovered problems with current implementations of placing qubits to improve execution of a quantum program. Through applied effort, ingenuity, and innovation, Applicant has solved many of these identified problems in the various implementations and solutions embodied in the present disclosure, which are described in detail below.

BRIEF SUMMARY

In general, embodiments of the present disclosure provided herein provide for improved global qubit placement in a quantum computing environment (e.g., a QCCD quantum computing environment). Such improved global qubit placement improves the overall execution of the quantum program by reducing the amount of quantum computing resources, memory errors, and time required in executing the quantum program, such as by reducing the number of overall operational steps required to position the qubits for each time slice of parallel gates required to execute a quantum program. Other implementations for global qubit placement will be, or will become, apparent to one with skill in the art upon examination of the following figures and detailed description. It is intended that all such additional implementations be included within this description be within the scope of the disclosure and be protected by the following claims.

In accordance with one aspect of the disclosure, a computer-implemented method for improved global qubit placement in a quantum computing environment is provided. The computer-implemented method may be performed via any of the various computing devices as depicted and described herein, for example embodied in hardware, software, firmware, and/or any combination thereof. In accordance with at least one example implementation of the computer-implemented method, the example computer-implemented method includes identifying a qubit grouping set representing a quantum program associated with a qubit set. The example computer-implemented method further includes generating an initial layered graph including a node set and an edge set arranged into one or more layers representing one or more time slices, where each node of the node set represents a qubit group of the qubit grouping set, where each edge of the edge set connects a first node in a first layer of the one or more layers to a second node in a second layer of the one or more layers, the first node includes at least one qubit index shared with the second node. The example computer-implemented method further includes generating an efficient layered graph by transforming the initial layered graph utilizing a graph processing algorithm, where the graph processing algorithm reduces a number of edge crossings in the initial layered graph. The example computer-implemented method further includes determining a qubit position arrangement for the qubit set based at least in part on the efficient layered graph.

Additionally or alternatively, in some embodiments of the example computer-implemented method, the graph processing algorithm includes a Sugiyama algorithm implementation.

Additionally or alternatively, in some embodiments of the example computer-implemented method, the graph processing algorithm utilizes a barycenter heuristic to rearrange a subset of nodes at each layer of the one or more layers.

Additionally or alternatively, in some embodiments of the example computer-implemented method, the graph processing algorithm utilizes a randomized component to rank each node.

Additionally or alternatively, in some embodiments of the example computer-implemented method, the graph crossing algorithm implements a cost function that minimizes a number of required parallel swap time steps as a primary cost factor and the cost function minimizes a number of swap operations as a secondary cost factor.

Additionally or alternatively, in some embodiments of the example computer-implemented method, generating the efficient layered graph further includes generating at least one additional initial layered graph, each additional initial layered graph includes a randomly arranged first layer; generating an additional possible efficient layered graph for each additional initial layered graph by transforming each additional efficient layered graph utilizing the graph processing algorithm; and selecting the efficient layered graph from each possible efficient layered graph.

Additionally or alternatively, in some embodiments of the example computer-implemented method, the computer-implemented method further includes determining a parallel swap command set from the efficient layered graph; and inserting into the parallel swap command set at least one slide command based at least in part on a number of gate zones associated with a quantum computing environment and a number of qubits in the qubit set.

Additionally or alternatively, in some embodiments of the example computer-implemented method, the graph processing algorithm performs graph squeezing based at least in part on a qubit gating positions set.

Additionally or alternatively, in some embodiments of the example computer-implemented method, the initial layered graph includes a two-dimensional layered graph representing a linear quantum computing environment.

Additionally or alternatively, in some embodiments of the example computer-implemented method, the initial layered graph includes a three-dimensional layered graph representing a loop quantum computing environment.

Additionally or alternatively, in some embodiments of the example computer-implemented method, the computer-implemented method further includes executing a set of qubit manipulation instructions based at least on the qubit position arrangement to reposition the qubit set within a quantum computing environment.

In accordance with yet another aspect of the present disclosure, an apparatus for improved global qubit placement in a quantum computing environment is provided. In one example of the apparatus, the example apparatus comprises at least one processor and at least one non-transitory memory having computer-coded instructions stored thereon. The computer-coded instructions, in execution with the at least one processor, configures the apparatus to perform any one of the example computer-implemented methods described herein. In another example of the apparatus, the example apparatus comprises means for performing each step of any one of the computer-implemented methods described herein.

In accordance with yet another aspect of the present disclosure, a computer program product for improved global qubit placement in a quantum computing environment is provided. In one example of the computer program product, the example computer program product includes at least one non-transitory computer-readable storage medium having computer program code stored thereon that, in execution with at least one processor, configures the computer program product for performing any one of the example computer-implemented methods described herein.

BRIEF DESCRIPTION OF THE DRAWINGS

Figure 1:
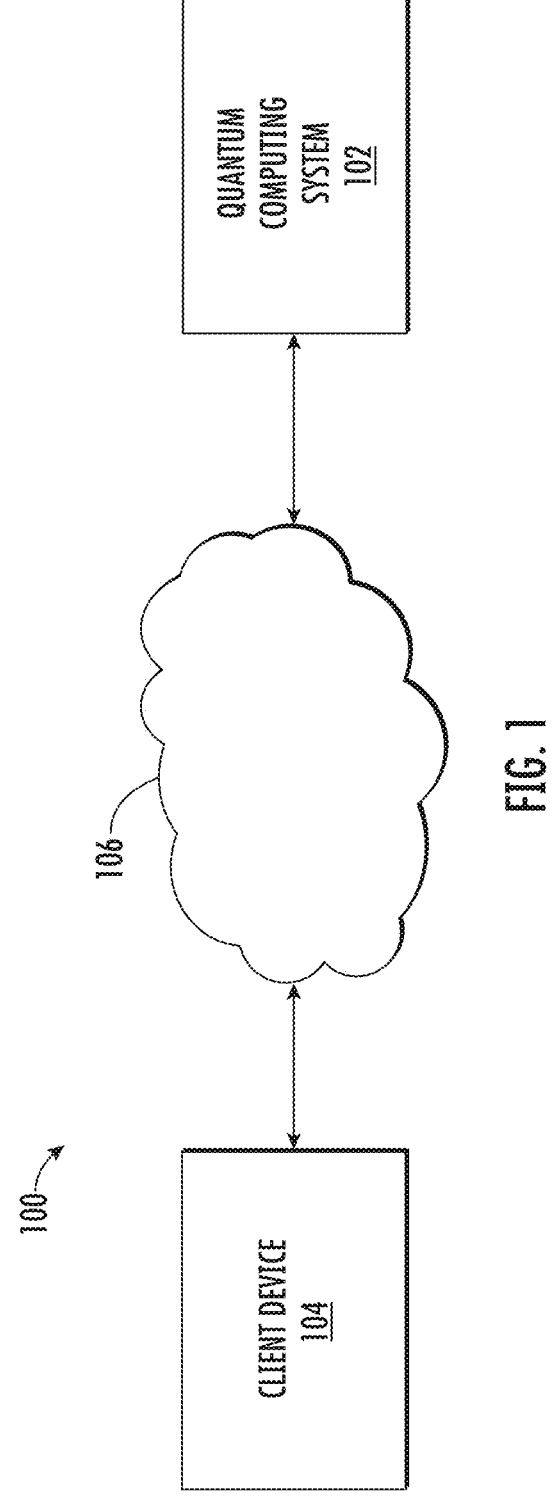
Figure 2:
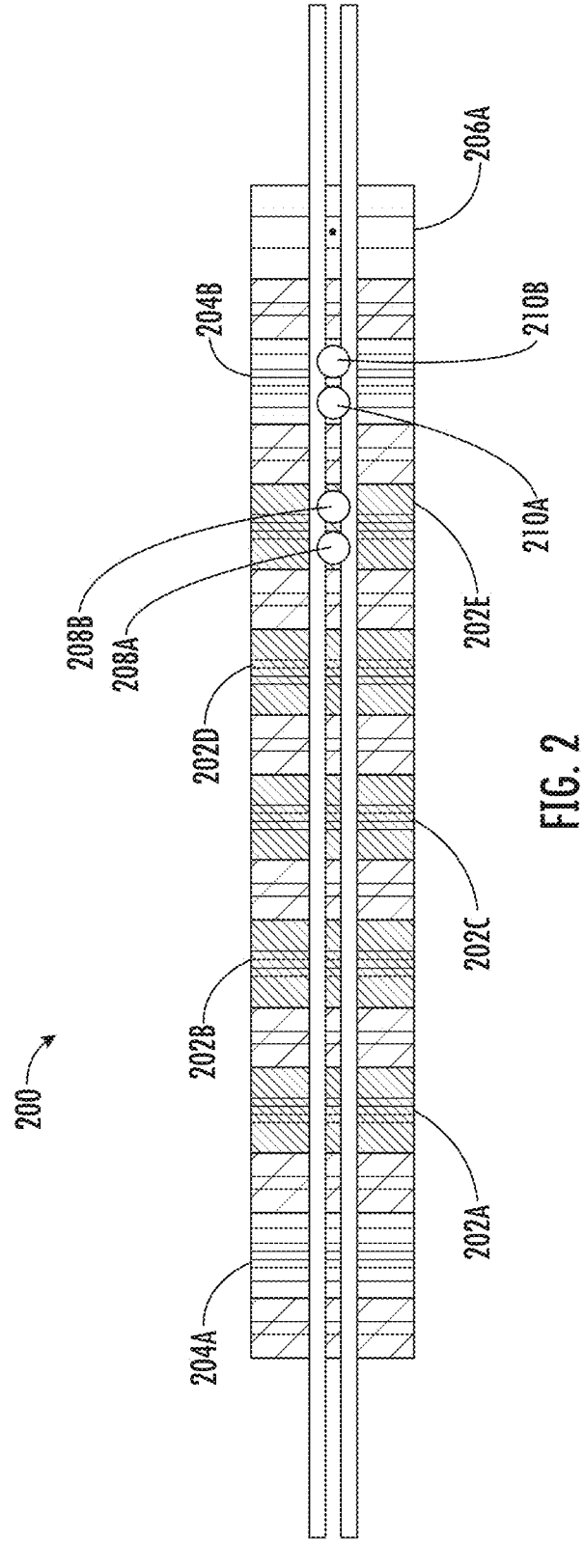
Figure 3:
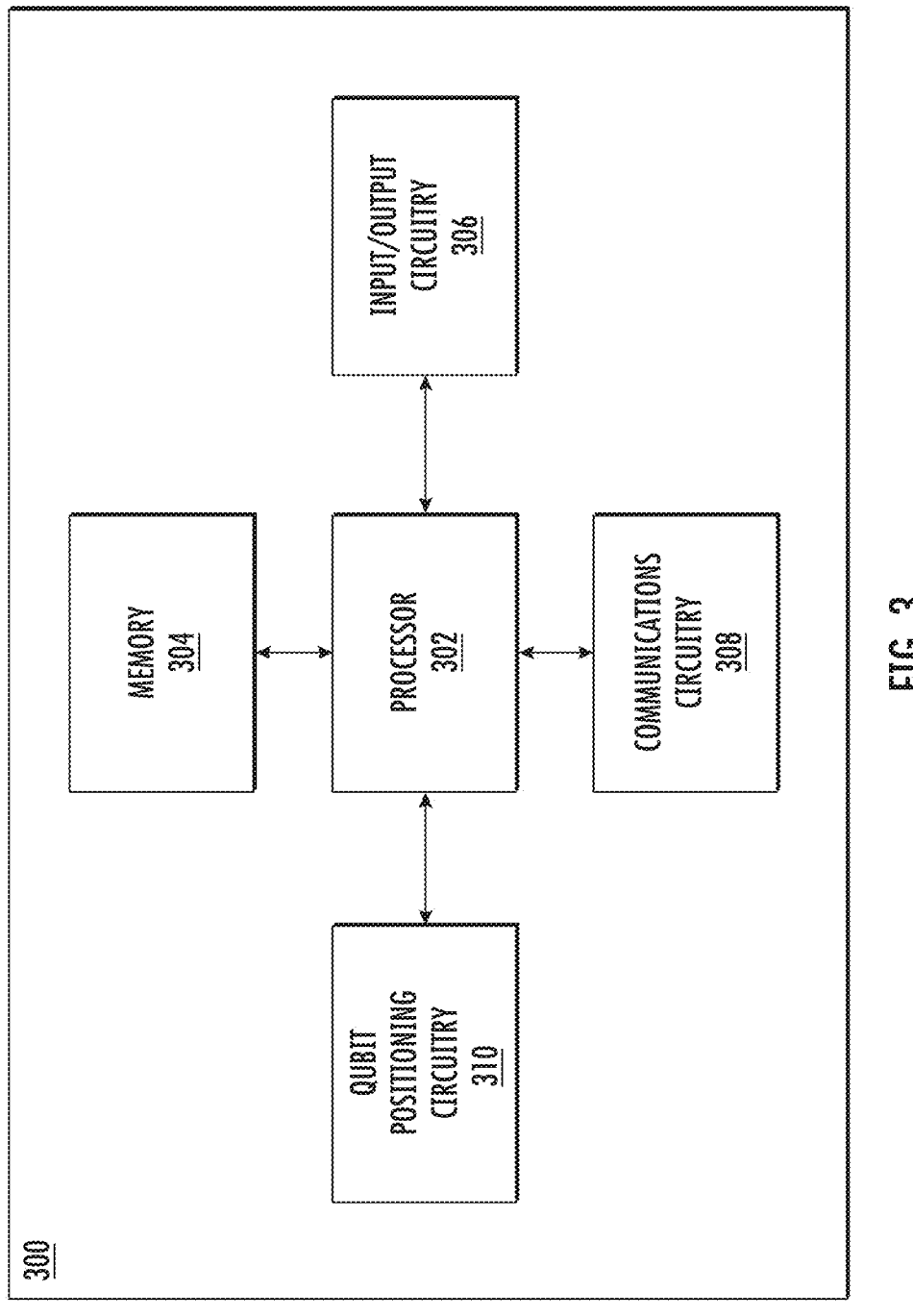
Figure 4:
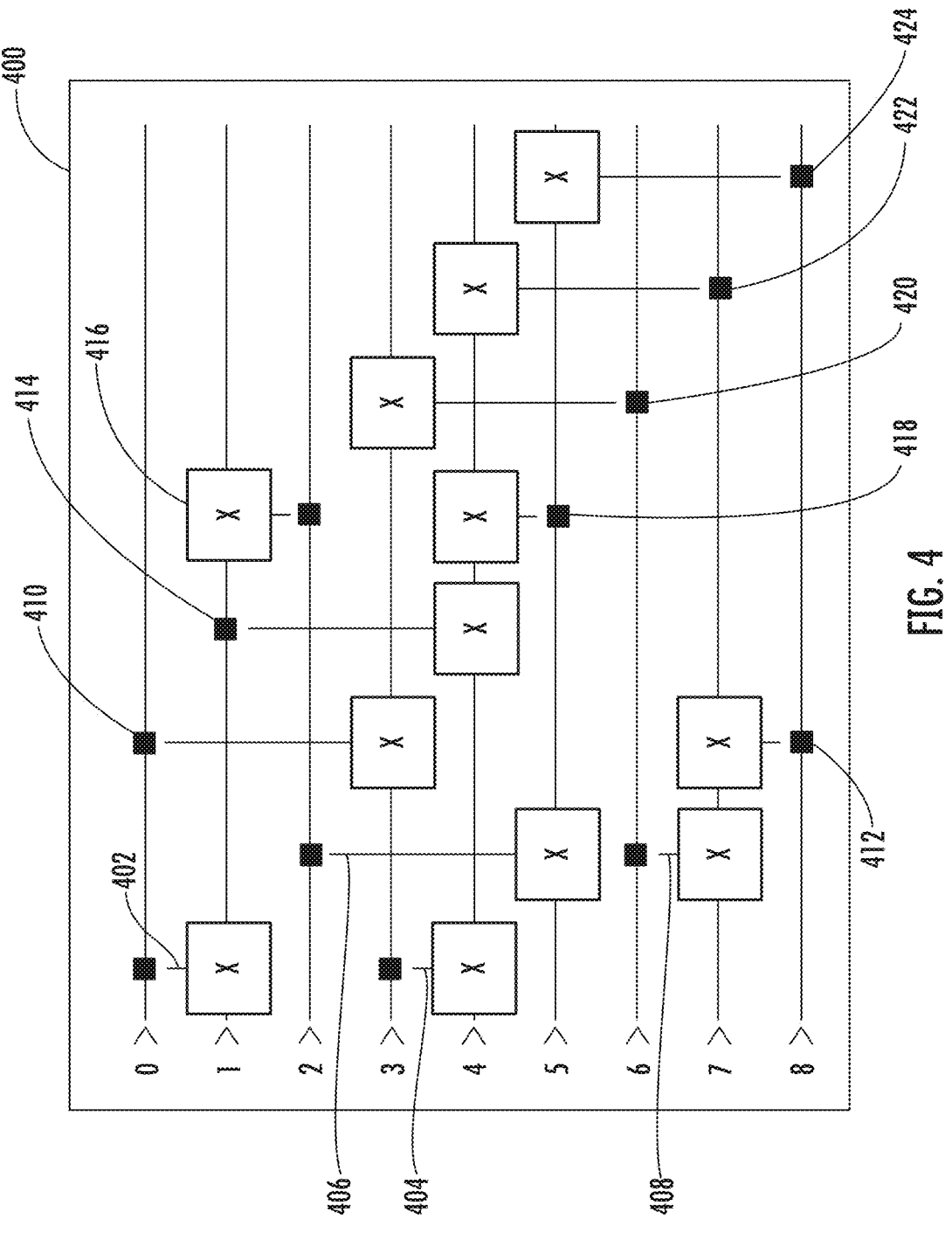
Figure 5:
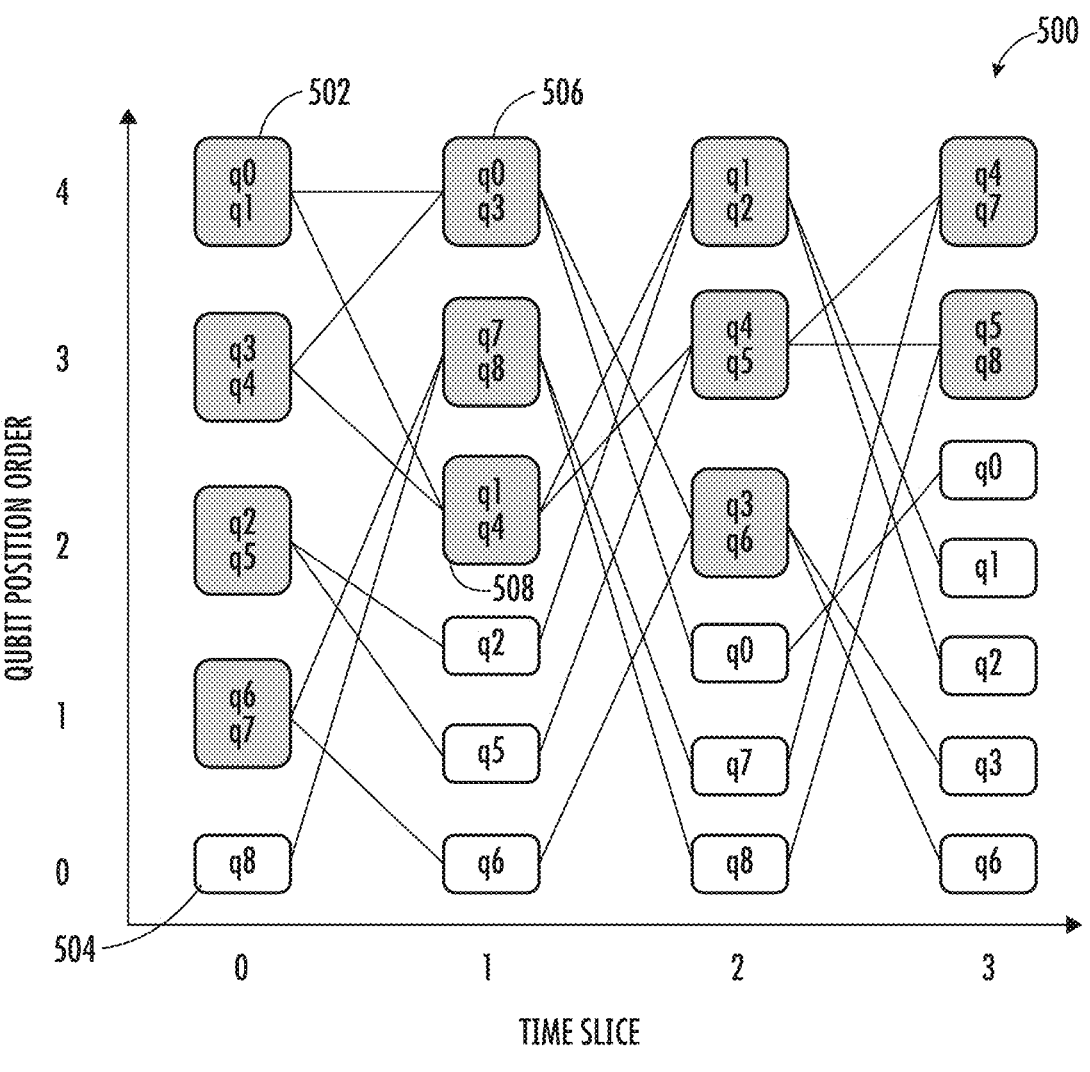
Figure 6:
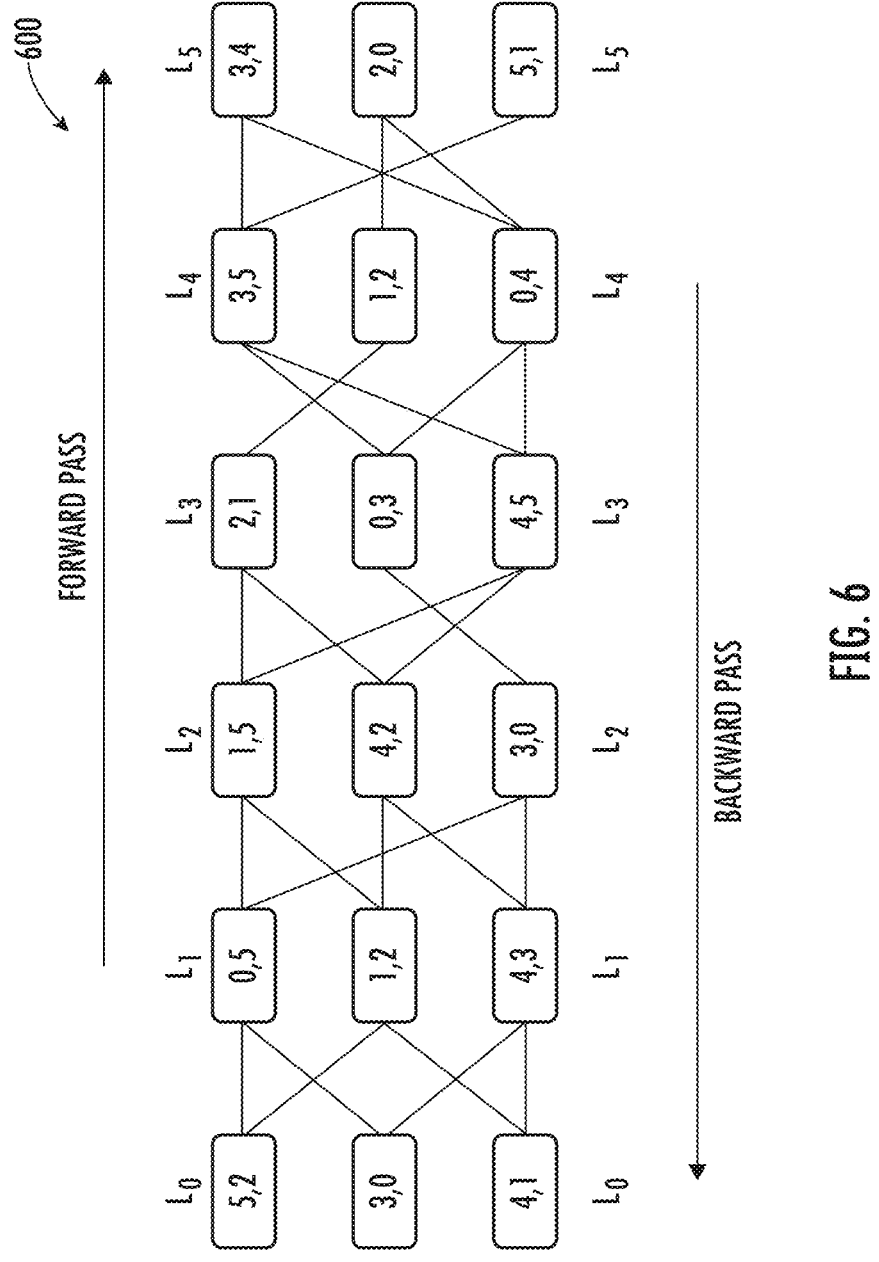
Figure 7:
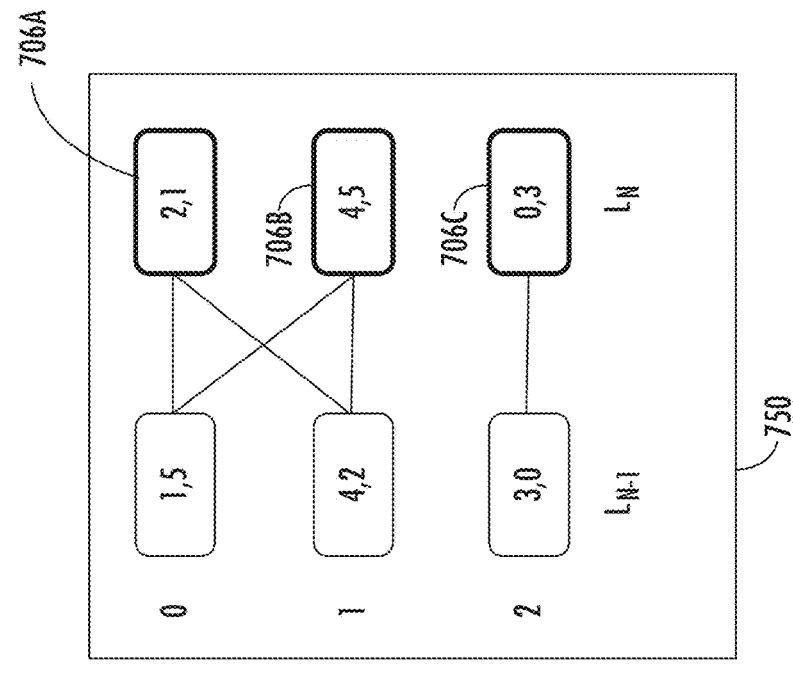
Figure 7:
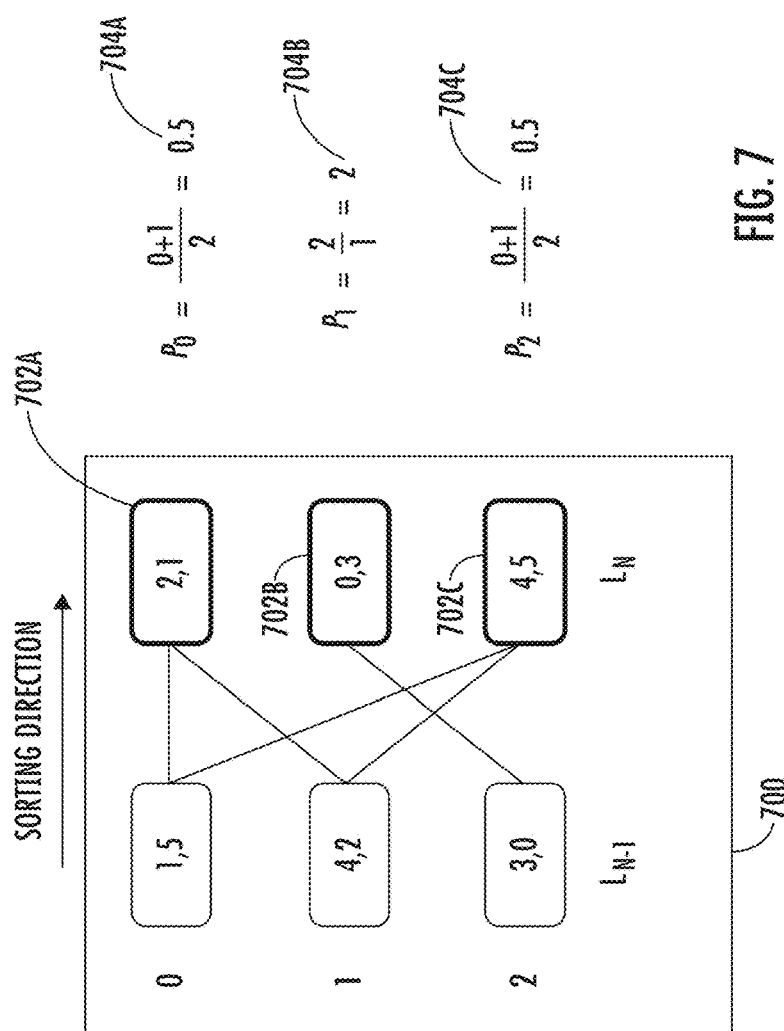
Figure 8:
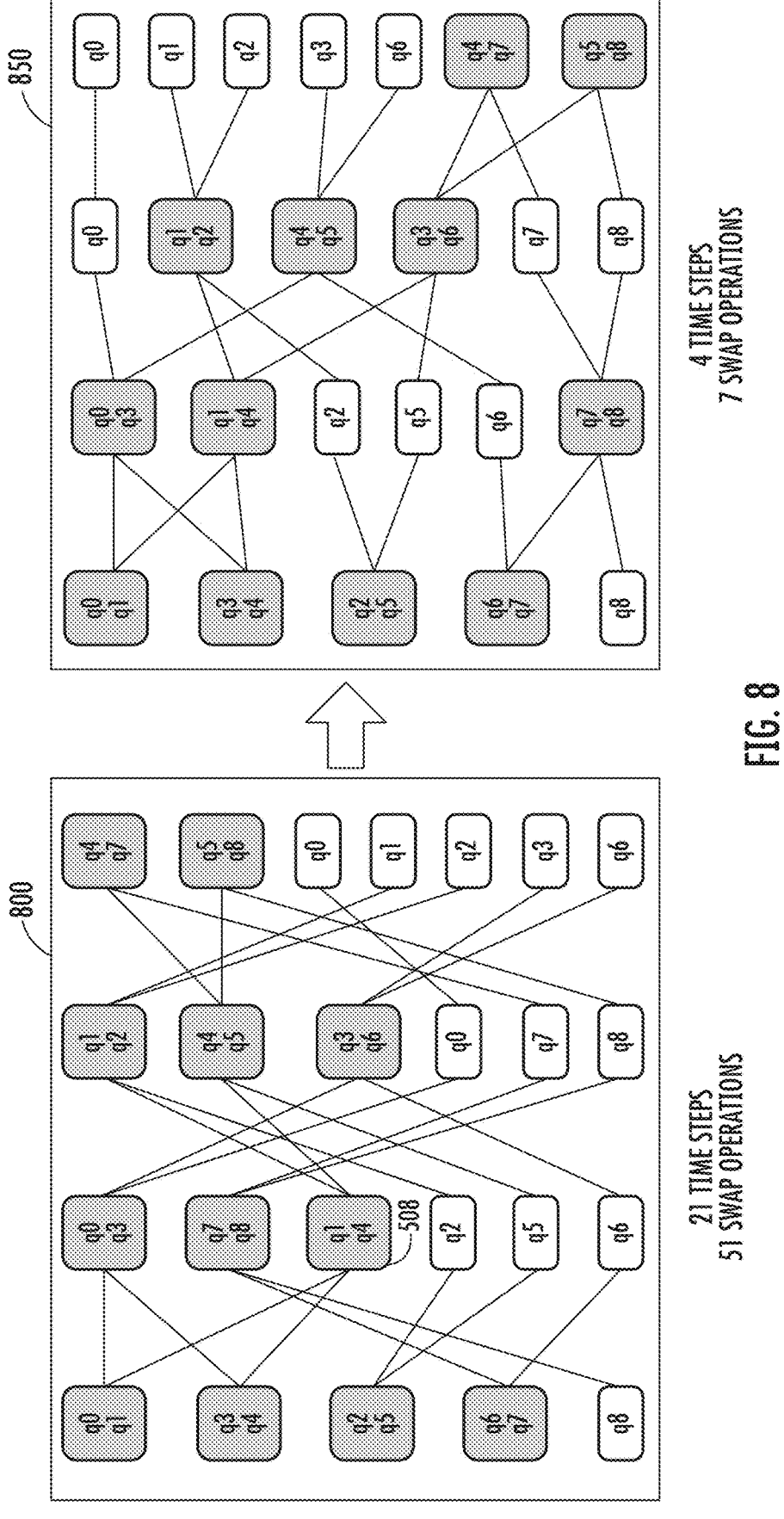
Figure 9:
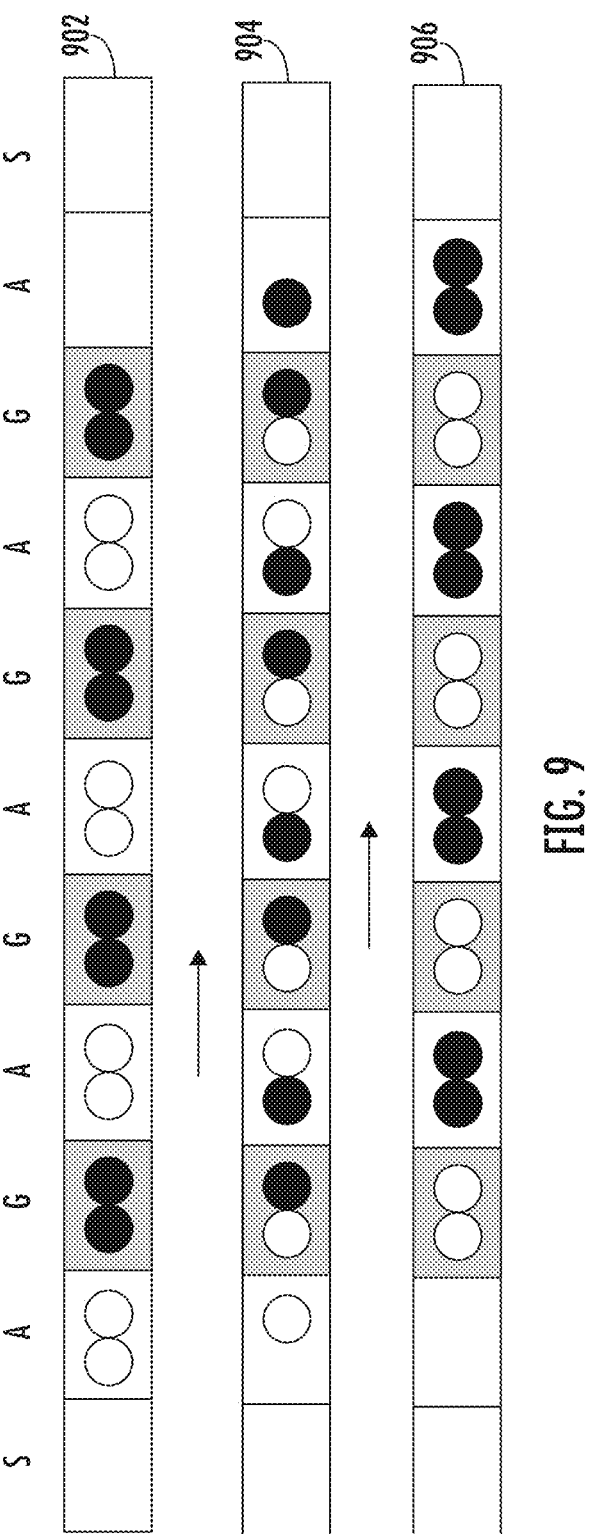
Figure 10:
Figure 11:
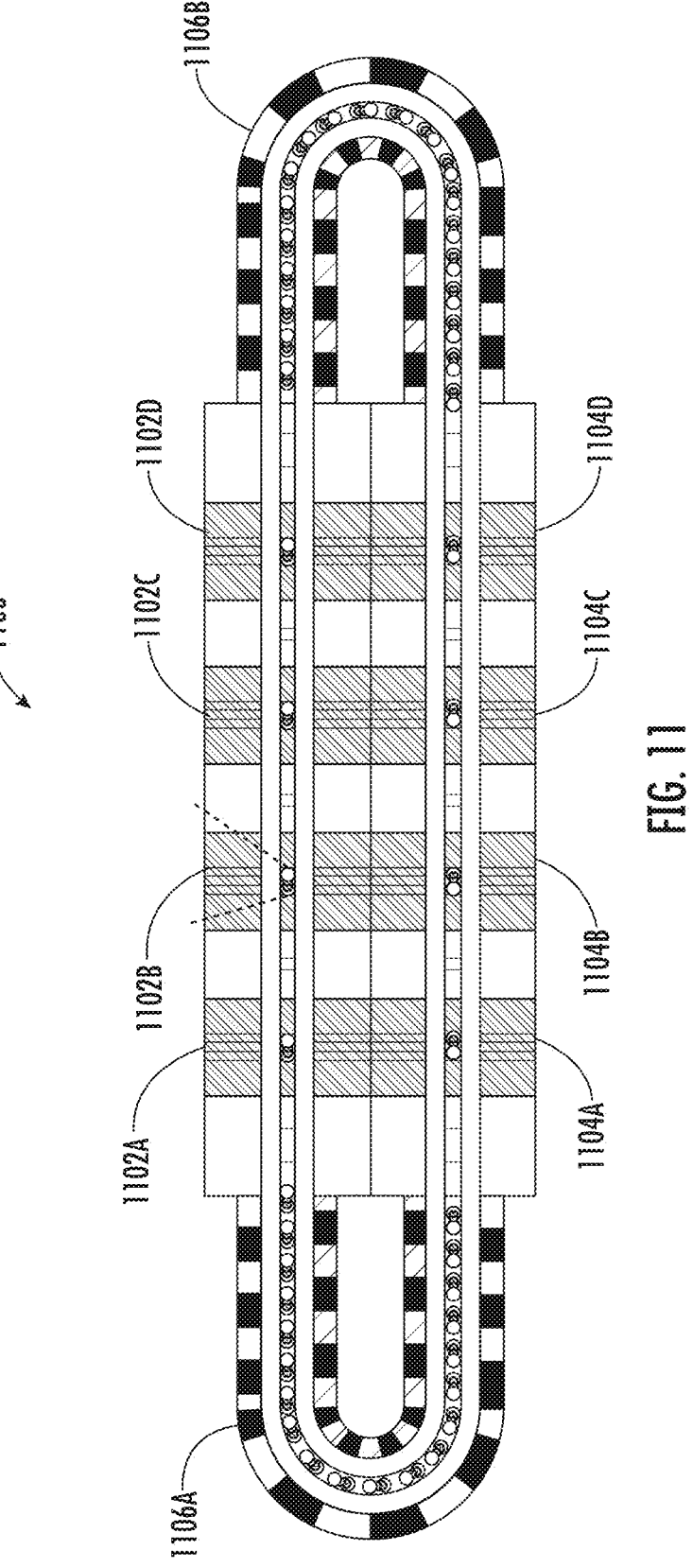
Figure 12:
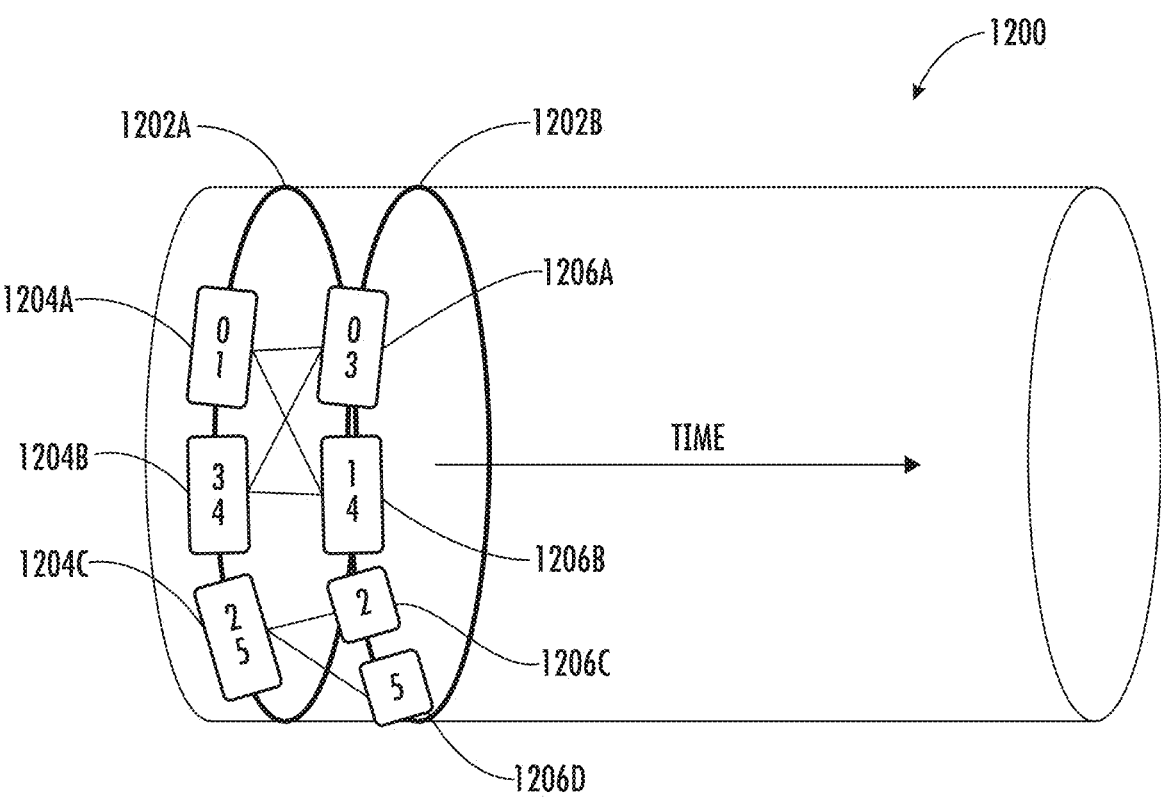
Figure 13:
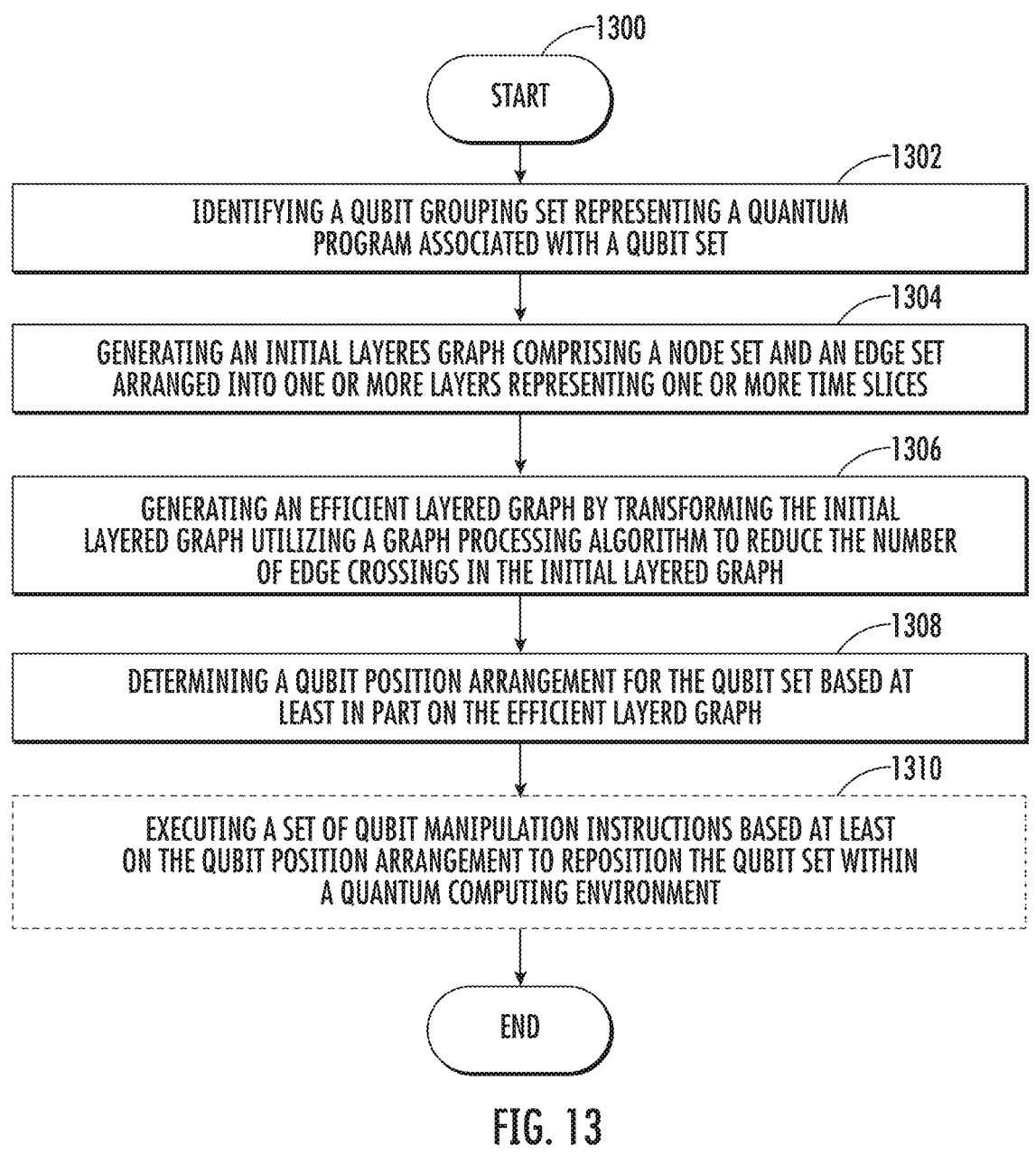
Figure 14:
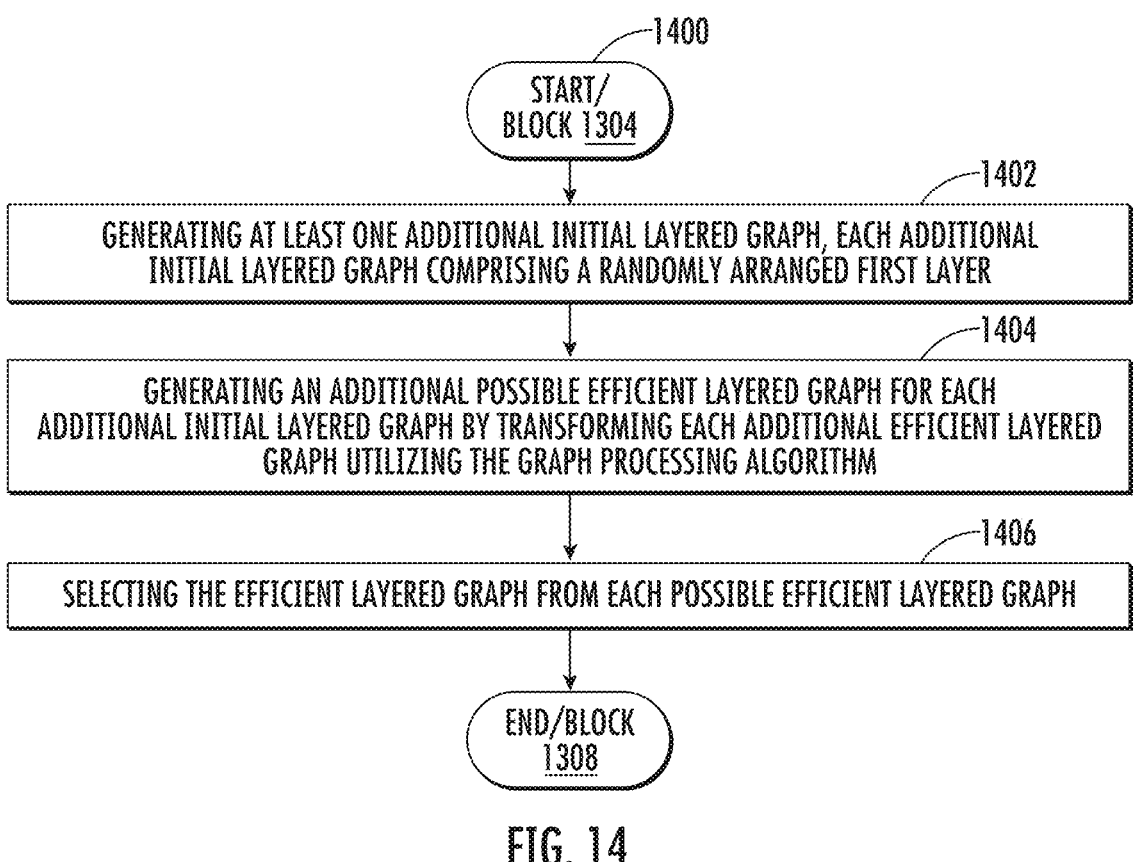
Figure 15:
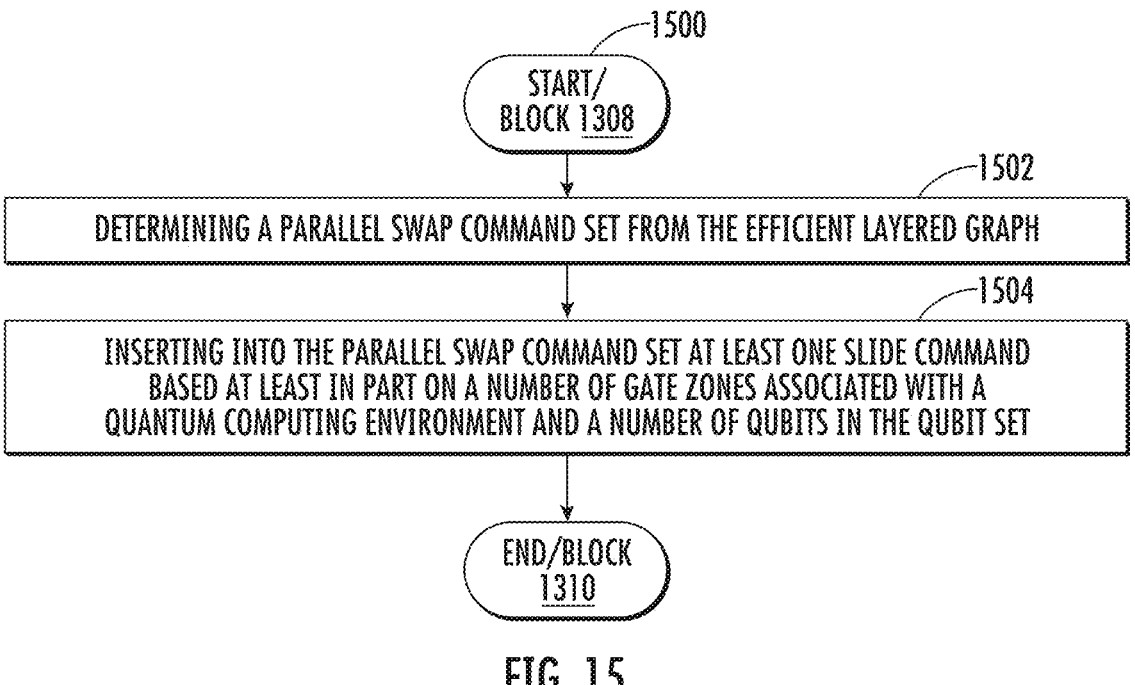

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates an example linear quantum computing environment that may be utilized within a quantum computer in accordance with at least some example embodiments of the present disclosure;

FIG. 3 illustrates a block diagram of an example apparatus that may be specially configured in accordance with at least some example embodiment of the present disclosure;

FIG. 4 illustrates an example quantum program representing an example qubit grouping set processable in accordance with at least some example embodiments of the present disclosure;

FIG. 5 illustrates a visualization of an example layered graph corresponding to a quantum program in accordance with at least some example embodiments of the present disclosure;

FIG. 6 illustrates a visualization of operations performed by an example graph processing algorithm in accordance with at least some example embodiments of the present disclosure;

FIG. 7 illustrates an example node reorganization step of an example graph processing algorithm in accordance with at least some example embodiments of the present disclosure;

FIG. 8 illustrates visualizations of an example layered graph reorganized via an example graph processing algorithm in accordance with at least some example embodiments of the present disclosure;

FIG. 9 illustrates visualizations of slide command implementations in accordance with at least some example embodiments of the present disclosure;

FIG. 10 illustrates example visualizations of graph squeezing in accordance with at least some example embodiments of the present disclosure;

FIG. 11 illustrates an example loop quantum computing environment that may be utilized within a quantum computer in accordance with at least some example embodiments of the present disclosure;

FIG. 12 illustrates another example visualization of an example layered graph corresponding to a quantum program within a quantum computer embodying a loop quantum computing environment in accordance with at least some example embodiments of the present disclosure;

FIG. 13 illustrates operations of an example process for improved global qubit placement in accordance with at least some example embodiments of the present disclosure;

FIG. 14 illustrates additional operations of an example process for improved global qubit placement based on a plurality of attempted initial qubit placements in accordance with at least some example embodiments of the present disclosure; and FIG. 15 illustrates additional operations for implementing slide command(s) of an example process for improved global qubit placement in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The terms "set" and "set of" refer to one or more data structures embodying any number of data objects of a particular type or multiple types. For example, a "set of values" refers to one or more data structures embodying any number of values.

The terms "OETS" and "EOTS" refer to odd-even transposition sort. The term "odd-even transposition sort" refers to a parallel sorting algorithm wherein elements are sorted in a series of one or more odd phases and even phases. During each phase, the values represented in any number of adjacent indices may be swapped in parallel, thus representing a parallel operation. During an even phase, pairs of indices with the lower index being even are compared and swapped if out of order. During an odd phase, pairs of indices with the lower index being odd are compared and swapped if out of order. An odd-even transposition sort begins at a starting phase, which may be either an even phase or an odd phase. The term "OETS cost" refers to the number of parallel time steps required to completely sort a particular set of data. For example, if an input data set requires an even phase, an odd phase, and a subsequent even phase until the input data set is fully sorted, the OETS cost for such a sorting operation is equivalent to three (3) steps. If an input data set requires an odd phase, an even phase, a subsequent odd phase, a subsequent even phase, and a final odd phase, the OETS cost for such a sorting operation is equivalent to five (5).

The term "QCCD" refers to a quantum charge-coupled device architecture that enables qubit storage and positioning via a number of positions. Qubits in a QCCD move to specific location(s) on a chip to perform quantum operations (e.g., via gating). An example QCCD architecture uses atomic objects confined within an atomic object confinement apparatus, such as ions trapped within an ion trap, as qubits. In one such example context, QCCD via ion trap(s) is implemented utilizing multiple control electrodes providing dynamic potential profiles for arbitrary ion re-arrangement.

The term "quantum computing environment" refers to one or more computing devices configured to enable performance of quantum operations involving one or more qubits. Non-limiting examples of a computing environment include various QCCD trapped-ion quantum computers.

The term "gate zone" refers to a zone within a particular quantum computing environment utilized for performing qubit operations based at least on the qubit positioned within the zone.

The term "linear quantum computing environment" refers to a quantum computing environment including a linear ion trap. The linear quantum computing environment may include any number of linearly arranged zones utilized for performing qubit operations, qubit loading zones, and/or qubit storage zones. Non-limiting examples of a linear quantum computing environment are described in U.S. patent application Ser. No. 16/717,602, titled "Apparatuses, Systems, and Methods for Ion Traps," filed Dec. 17, 2019, the contents of which are incorporate by reference herein in their entirety.

The term "loop quantum computing environment" refers to a quantum computing environment including a looped ion trap. The loop quantum computing environment may include any number of zones for performing qubit operations, qubit loading zones, and/or qubit storage zones arranged within a connected loop. Non-limiting examples of a loop quantum computing environment is described in U.S. Patent Application 63/199,279, titled "Apparatuses, Systems, and Methods for Elliptical Atomic Object Traps," filed Dec. 17, 2020, the contents of which are incorporated by reference herein in their entirety.

The term "qubit set" refers to one or more data objects representing any number of qubits within a quantum computing environment.

The term "qubit index" refers to data representation of a particular qubit within a qubit set or a position corresponding to a particular qubit of the qubit set. For example, qubit 0 may correspond to a first qubit of a qubit set, or a qubit currently at a first position of all positions within a quantum computing environment.

The terms "quantum program" and "quantum circuit" refers to any number of gate operations to be performed utilizing one or more qubits in a quantum computing environment. A quantum program may include any number of gating operations performed on one or more qubits of the quantum computing environment. Each "gate," "gate operation," or "gating operation" of a quantum program involves a single qubit or a qubit group.

The term "qubit group" refers to one or more qubit indices for gating at a particular time. In some contexts, a qubit group includes at least a first qubit index of the qubit group and a second qubit index of the qubit group to be gated. A qubit group may include only one qubit index in a circumstance where the qubit group corresponds to a gate representing a unary logical operation. In some contexts, a qubit group includes three or more qubits to be gated. The term "qubit grouping set" refers to any number of qubit groups to be executed at a particular time slice or a plurality of time slices.

The term "qubit manipulation instruction" refers to computing instructions that effectuate a repositioning of at least one qubit within a quantum computing environment. Non-limiting examples of a qubit manipulation instruction include a split instruction, a shift instructions, a combine instruction, a join instruction, and a swap instruction.

The term "layered graph" refers to a graph representation of one or more node(s) arranged into any number of layers, where the arrangement of nodes into the layers is non-arbitrary. In one example context, a layered graph comprises a set of nodes representing positions within a quantum computing environment arranged into one or more layers, where each layer represents a time step for performing parallel gating of qubits according to a quantum program.

The term "layer" refers to a depth of a node from a starting position in a particular layered graph. Each layer represents a sorted state of qubits to enable gating of such qubits or a portion thereof, where the qubits are sorted between each layer and a subsequent layer with a particular sorting algorithm (e.g., odd-even transposition sort). Each transition between a first layer and a second layer may represent any number of parallel time steps required to sort the qubits from their position indices represented in the first layer to their position indicates represented in the second layer. In the context of utilizing an OETS algorithm for repositioning qubits in accordance with a first layer to a subsequent second layer, the actual time required for executing each parallel time step is the time required to complete the OETS algorithm. For example, the first layer may include one or more starting node(s), the second layer may include one or more node(s) connected to the starting nodes by a single edge, the third layer may include one or more node(s) connected to the starting node by two edges (e.g., a first edge from the first, starting layer to the second layer, and a second edge from the second layer to the third layer), and so on, that links nodes representing the position of a qubit index shared between such nodes.

The term "edge crossing" refers to an intersection of a first edge in a layered graph with a second edge in the layered graph. For example, a first edge connecting a first node of a first layer to a second node of a second layer may intersect a second edge connecting a third node of the first layer to a fourth node of the second layer in circumstances where the position differential between the first node and the second node overlaps the position differential between the third node and fourth node.

The term "initial layered graph" refers to a layered graph comprising one or more layers that has not been processed to improve the layout of the nodes at each layer. The term "efficient layered graph" refers to a layered graph after processing via a graph processing algorithm that attempts to improve the layout of the layered graph.

The term "graph processing algorithm" refers to an algorithm or heuristic implementation that is determinable or otherwise known to, upon execution, improve the layout of a layered graph by reducing or otherwise minimizing an amount of edge crossings between layers of a layered graph.

The term "cost factor" refers to a weighting and/or ranking algorithm utilized by a graph processing algorithm to rank nodes for positioning within one or more layers of a layered graph. A graph processing algorithm may be associated with multiple cost factor(s) that serve as a priority list for ranking and/or otherwise weighting the nodes. The term "primary cost factor" for example refers to a highest priority cost factor utilized by a graph processing algorithm, whereas the term "secondary cost factor" refers to a second priority cost factor utilized by the graph processing algorithm in circumstances where a primary cost factor determined by the graph processing algorithm for two layered graphs is determined to be equivalent.

The term "two-dimensional layered graph" refers to a layered graph represented in two dimensions, the first dimension representing the ordered positions of qubits in a linear quantum computing environment and the second dimension representing one or more time slices.

The term "three-dimensional layered graph" refers to a layered graph representation in three dimensions, the first dimension and second dimension representing the ordered positions of qubits in a loop quantum computing environment and the third dimension representing one or more time slices.

The term "qubit position arrangement" refers to a data representation of positions for qubit indices corresponding to a qubit set for one or more time steps representing a quantum program. A global placement of qubits embodied in a qubit position arrangement includes the position index for each qubit at each time slice of a quantum program to enable the qubits to be gated for performing the various operations required as part of the quantum program. In some example embodiments, the qubit position arrangement includes any number of sub-arrangements, each sub-arrangement indicating the position index for each qubit at a particular time slice.

The term "randomized component" refers to one or more arbitrary or otherwise randomized data value(s) that may be introduced as part of a graph processing algorithm. A randomized component as used herein is of a value that will break ties in ranks between two nodes without increasing or decreasing the rank of either node above the next node in the ranking order or the lower node in the ranking order.

The terms "parallel swap time step" and "time slice" refers to a time step having any number of swap operations that may be performed in parallel with one another without affecting another operation performed in the same time step.

The terms "swap operation" and "swap command" refer to a change in the positions of two adjacent qubits to the position of the other qubits. For example, a first qubit at a first position adjacent with a second qubit at a second position are undergo a swap operation (e.g., are "swapped") such that the first qubit is repositioned to the second position and the second qubit is repositioned to the first position. The term "parallel swap command set" refer to all swap operations determined to be performable at a particular parallel swap time step The term "randomly arranged first layer" refers to generation of a first layer of nodes in a layered graph where the arrangement of the nodes at particular node positions is randomized and/or otherwise arbitrary.

The term "slide command" refers to a directional shift in all qubit positions or a subset of qubit positions within a particular quantum computing environment by one position in a particular direction. The terms "left slide" and "left slide command" refer to a position shift of each qubit of a particular qubit set from a current position to a next left position. The terms "right slide" and "right slide command" refer to a position shift of each qubit of a particular qubit set from a from a current position to a next right position.

The term "graph squeezing" refers to expanding a graph associated with a particular number of gate zones by pushing one or more gate operations to a subsequent layer associated with a subsequent time step. The source layered graph includes a certain number of gate zones performable in parallel and corresponding to a particular number of layers, and the layered graph resulting from graph squeezing includes an increased number of layers associated with less gate zones performable in parallel. Graph squeezing includes any process to advance a number of gate operations to one or more future time steps.

The term "qubit gating positions set" refers to a data representation of position indices assigned to one or more qubits of a qubit set at a particular time step or a plurality of time steps. In some embodiments, a qubit gating positions set embodies a vector with each index indicating a qubit index or position index to be moved to that position.

Overview

QCCD trapped-ion quantum computers with various geometries (e.g., linear or loop) are emerging as capable noisy intermediate-scale quantum devices. These architectures rely on physical qubit transport to rearrange qubits into particular positions for gating and/or interaction. In this regard, ion traps may be segmented into various optically active gate zones (or "gate zones") that are utilized to perform quantum gate operations, and optically inactive storage or auxiliary zones that are used for temporary storage of qubits not involved in current gating operations.

Execution of a quantum program (e.g., a quantum program embodying a quantum circuit of various gate operations to be performed) via such a QCCD linear trap architecture includes a multi-step process. For example, the process includes a scheduling step that selects a set of gates with a preference for maximized parallel operations. The process includes a second, routing step that moves the qubits for the selected gate operations into the gate zones. These steps may be repeated any number of times until all circuit operations are executed by the quantum computer.

Regardless of how lengthy and/or complicated a quantum program, it is desirable to have the quantum computer perform in a manner that is as error-free and quick as possible. In this regard, the maximum complexity for execution of a quantum computing circuit is limited significantly by the lifetime (e.g., coherence time) of the qubits. The inventors have identified that parallelizing the operations performed on the qubits is a primary driver to decrease the total amount of time spent executing a quantum program.

Two important metrics that drive the quality of execution for a quantum program on a QCCD ion-trap device include gate fidelity and execution speed. Gate fidelity is primarily a function of the quality of physical controls of the quantum computer, such as laser control and its noise characteristics. Physically moving ions around the trap results in ion heating, and heating the ions indirectly affects fidelity. In this regard, to perform high-quality gating, ions need to be cooled to sub-Doppler temperatures. The time required for the cooling operation is a function of the heat accumulated during ion transport. In addition, ion transport directly affects circuit execution speed. Further still, ion transport can add to memory error, contributing to further reduction in gate fidelity. Accordingly, the inventors have identified that minimizing the time spent transporting ions around an ion-trap device improves both overall circuit fidelity and speed of device operation, and therefore serves as an important metric as directly or indirectly affecting the two other metrics described above.

Reducing the number of transport moves required to perform the required set of gates representing a quantum program may be broken down into two sub-parts: a problem of efficient routing and a problem of efficient global placement. Efficient routing involves rearranging qubits from one gating configuration to the next, for example as time slices for parallel execution progress. The inventors have identified that near-optimal routing may be achieved by employing a parallel odd-even transposition sort algorithm, which performs a series of odd-even sort steps for permuting adjacent qubit positions. Utilizing odd-even transposition sort, determining an efficient routing of qubits has a complexity of O(N) time complexity, where N is the number of qubits (e.g., it takes a maximum of N parallel time steps to re-arrange qubits from any starting configuration to a desired target configuration). Example implementations for performing odd-even transposition sort between time steps are described in U.S. application Ser. No. 17/319,511, titled "APPARATUSES, COMPUTER-IMPLEMENTED METH-ODS, AND COMPUTER PROGRAM PRODUCTS FOR INSTRUCTION COMPILATION FOR AT LEAST ONE TIME SLICE IN A ONE-DIMENSIONAL QUANTUM COMPUTING ENVIRONMENT," filed May 13, 2021, the contents of which are incorporated by reference herein in their entirety. Accordingly, utilizing odd-even transposition sort implementations may address the routing sub-problem with sufficiently efficient O(N).

The remaining sub-problem of efficient global placement has remained unsolved. In this regard, the problem of efficient global placement may be considered as how to minimize the amount of transports required to perform a quantum program by placing qubits in a way that reduces routing cost. In this regard, efficient global placement involves determining a favorable starting configuration upon which to apply the odd-even transposition sort routing such that all gates are performed in an efficient manner. Though several integer linear processing optimization techniques have been demonstrated to work, the problem of determining optimal qubit placement is equivalent to other non-deterministic polynomial-time (NP) hard problems, such as the well-known traveling salesman problem having a time complexity of $O((N \cdot D)!)$ where N is the number of qubits and D is the circuit depth. In this regard, the exact, optimal solutions scale very poorly with the size of the quantum computing device. Integer linear optimization techniques perform well, but do not scale well in computational time, and are generally useless for N>10 qubits due to the excessive amounts of computing time and power otherwise required to determine the optimal solution in a very large combinatorial state space. Accordingly, conventional implementations that attempt to address the problem of efficient global placement fail to sufficiently function in an expeditious manner for all quantum computing environments.

Embodiments of the present disclosure provide for near-optimal global qubit placement in an executable amount of time. Embodiments of the present disclosure develop a heuristic for such near-optimal global qubit placement utilizing graph-based approaches. Some embodiments utilize a graph-based approach that generate layers of nodes representing qubits paired at various positions for gating at various time slices, and edges that connect nodes having or otherwise representing like (e.g., "shared") qubit indices. In this regard, graph processing algorithms may be employed for minimizing edge crossings, thus representing the problem of global qubit placement as a graph layout optimization problem. Such approaches determine an improved global qubit placement, and in many contexts near-optimal global qubit placement, in a significantly reduced amount of required execution time. For example, graph processing algorithms are provided herein that execute in quadratic ($O(N^2)$) time relative to the number of qubits N. Utilizing particular heuristics and graph processing algorithms described herein, the inventors have determined that various embodiments identify global qubit placement embodying a routing solution that is within 10% of the true optimal number of routing steps. As such, embodiments of the present disclosure both improve the execution time for quantum programs and reduce execution error likelihood by reducing the time required for parallel swap steps and/or number of qubit swaps. Embodiments of the present disclosure thereby provide various technical improvements to operations of quantum computers as described herein.

Embodiments of the present disclosure allow for practical implementations that scale with the number of qubits. Embodiments of the present disclosure have shown a 50% reduction in overall transport for different types of quantum programs as compared to previously known algorithms for global qubit placement. Embodiments of the present disclosure have been shown to reach within 10% of the true optimal solution while significantly outperforming conventional integer linear programming optimization and direct computation techniques on the time-to-solution by orders of magnitude due to the NP-hard nature of such conventional algorithms. As a result, embodiments provided herein enable rapid compilation time (e.g., tens of seconds) for placement of suitable submitted quantum programs on a QCCD quantum system rather than significantly slower (e.g., thousands of seconds) compilation time required for determining optimal placement. Further, embodiments of the present disclosure improvements to execution speed reduce circuit runtime and memory error associated with transport. In various embodiments, the near-optimal global qubit placement is determined by a conventional or classical computer (e.g., a computer using one or more semi-conductor processing elements to perform computations).

Additionally or alternatively, embodiments of the present disclosure provide a myriad of technical advantages in the field of quantum computing. For example, some embodiments of the present disclosure reduce the number of parallel swap time steps and/or total swap operations required to execute a quantum program, thus producing less transport-induced heating. By producing less transport-induced heating, the time required to cool the qubits to the ground state is reduced, and/or gate fidelity is improved with the same amount of cooling applied to such qubits. Additionally or alternatively, by reducing the number of parallel swap time steps and/or total swap operations required to execute a quantum program, embodiments of the present disclosure reduce the likelihood of unintentional changes to the ion crystal configuration resulting in an erroneous execution due to a failed swap operation. Additionally or alternatively still, the improved execution speed reduces the likelihood of memory error by reducing the amount of time from when a qubit is initialized to the time that it is read out (e.g., utilized in a gating operation). By reducing the active qubit time, memory error is reduced and overall circuit fidelity is improved. Each of such technical improvements to the field of quantum computing is provided, at least in part, by utilizing a graph processing algorithm as described herein to reduce the number of edge crossings to reduce the number of parallel time steps and/or swap operations to be performed to position each qubit to positions satisfactory for enabling execution of all gating operations of a particular quantum program.

Some embodiments may place a premium on minimizing total swap operations rather than the linear transports of qubits to reduce the time consumed in cooling qubits during circuit execution. This decision may be made to ensure the cost function utilized by graph processing algorithms minimize the most costly factor of executing the quantum program (e.g., in terms of time, computing resources, and/or the like). In other contexts and as operational needs are updated, the modularized cost functions described herein may be amended to enable the highest priority cost factor to be prioritized, and subsequent cost factors prioritized in the order most desired.

Example Systems and Apparatuses of the Present Disclosure

FIG. 1 illustrates a block diagram of a system that may be specially configured within which embodiments of the present disclosure may operate. Specifically, FIG. 1 depicts an example system 100. The example system 100 includes a client device 104 and a quantum computing system 102. The client device 104 and quantum computing system 102 are communicable via a communications network 106. It should be appreciated that, in other embodiments, the system 100 includes one or more additional and/or alternative devices, which may operate independently and/or communicate with other devices of the system.

In some embodiments the client device 104 embodies one or more computing devices embodied in hardware, software, firmware, and/or any combination thereof. The client device 104 may be embodied by a user device configured to provide various functionality. In this regard, the client device 104 may embody a conventional computing environment that interacts with the quantum computing system 102. Non-limiting examples of a client device 104 include a specially configured mobile device, tablet, smartphone, personal computer, laptop, enterprise terminal, and/or the like. In some embodiments, the client device 104 is configured entirely by specially configured software application(s) installed to and/or otherwise executable via the client device 104 to provide various functionality for accessing and/or otherwise controlling the quantum computing system 102 as described herein. In various embodiments, the client device 104 is a conventional and/or classical computer.

In some embodiments, the client device 104 includes specially configured hardware, software, firmware, and/or a combination thereof, that enables access to and/or configuration of the quantum computing system 102. In some embodiments, the client device 104 provides access to functionality for generating and/or retrieving a quantum program for execution via a quantum computer of the quantum computing system 102. In this regard, the client device 104 may receive one or more user input(s) for constructing and/or that otherwise embody the quantum program to be executed. In this regard, a user of the client device 104 may interact with the client device 104 to construct a quantum circuit, store the quantum circuit, and submitting the quantum circuit for execution via a quantum computing system, such as the quantum computing system 102. In some embodiments, the client device 104 is embodied by a user-facing device of the quantum computing system 102, for example such that communications can occur without requiring the communications network 106.

Alternatively or additionally, in some embodiments, the client device 104 enables user input and/or output for accessing the quantum computing system 102 to execute a quantum program. In some embodiments, the client device 104 communicates with one or more computing devices of the quantum computing system 102, such as a controller, that generates and/or compiles instructions for executing via a quantum computer. For example, in some embodiments, the quantum computing system 102 includes a controller that receives the quantum program from the client device 104 and compiles it to produce control system instructions embodying hardware manipulation instructions for running the quantum program on a specific quantum computer. In some embodiments, the controller is embodied by one or more computing devices external from but communicable with the quantum computing system 102. For example, the controller may be embodied by a circuit compiler embodied in a dedicated computing system embodied in hardware, software, firmware, and/or a combination thereof internal or external to the quantum computing environment 102, dedicated hardware communicable with a quantum computer of the quantum computing system 102, software executing on a computing system communicable with the quantum computer of the quantum computing system 102, and/or the like, The quantum computing system 102 may include one or more computing device(s) that enable compilation of a quantum program and/or use of a quantum computer for preforming a quantum program. In some embodiments, for example, the quantum computing system 102 includes a controller, a quantum computing environment, and various devices for physically manipulating the quantum computer. The quantum computing environment may include an ion trap architecture (e.g., linear, loop, and/or the like) for storing and manipulating qubits for gating. The controller may embody one or more computing device(s) embodied in hardware, software, firmware, and/or a combination thereof, that control the various devices that manipulate the quantum computer. Such control device(s) may include laser(s), cooling device(s), and/or the like. In some embodiments, the controller embodies a conventional computing system, for example specially configured via one or more specialized software application(s) to execute one or more process(es) that determine positions for the qubits at various time steps and/or instructions for repositioning the qubits to such position. For example, the controller may determine position assignments for each qubit at various time steps, and/or instructions embodying swap commands to cause the qubits to reach such positions at each of the appropriate time steps. In some embodiments, one or more device(s) of the quantum computing system 102 (e.g., a controller) receive data from the client device 104 that embodies the quantum program, instructions to be performed to manipulate the quantum computer, and/or the like.

FIG. 2 illustrates an example linear quantum computing environment that may be utilized within a quantum computer in accordance with at least some example embodiments of the present disclosure. Specifically, FIG. 2 illustrates an example QCCD ion trap 200 ("ion trap 200") representing a linear quantum computing environment. The ion trap 200 may be configured to manipulate, store, and/or otherwise interact with one or more qubits as depicted and described for gating in accordance with one or more quantum programs. Non-limiting example implementation details of the linear ion trap 200 are described in U.S. patent application Ser. No. 16/717,602, titled "Apparatuses, Systems, and Methods for Ion Traps," filed Dec. 17, 2019 the contents of which are incorporated by reference herein in their entirety.

As illustrated, the ion trap 200 includes a plurality of gate zones 202A-202E ("gate zones 202"). Each of the gate zones 202A may represent one or more positions within the ion trap 200 that enable a particular logical gate to be performed based on the qubit(s) in such positions. In some embodiments, two or more qubits are positioned at adjacent positions within one or more gate zone(s). In this regard, qubit groups to be gated may be repositioned to reach each of the gating zones to enable such gating. As illustrated, for example, the ion trap 200 includes a first qubit group comprising qubit 208A and qubit 208B positioned in the gate zone 202E. As such, a gate operation may be performed based on the representations of each of the qubits 208A and 208B. The result of the gate operation may be stored and/or further processed.

The ion trap further includes a plurality of storage zones 204A-204B ("storage zones 204"). Each of the storage zones may be configured to store one or more qubits, and are not optically active and thus cannot be utilized for performing gating operations. The storage zones 204 may be utilized to store qubit that are to be utilized in a subsequent time slice. In this regard, qubits may be positioned in the storage zones 204 to maintain such qubits in positions closest to usable gating zones (e.g., the gate zones 202) without impacting gate operations performed for the current time step within the gate zones 202. For example, as illustrated, the ion trap 200 includes qubit 210A and qubit 210B positioned in the gate zone 204B. The storage zones may be used for storage and/or one or more transport operations, such as swap operations into neighboring zones. The qubits 210A and 210B may embody a second qubit group for gating at a subsequent time slice (e.g., a next time slice after gate operations are performed for the qubits currently in the gate zones 202), or may embody individual qubits to be positioned with one or more qubits in other zones of the ion trap 200 (e.g., qubits in one or more of the gate zones 202 or the storage zone 204A).

The illustrated ion trap 200 further includes auxiliary zone 206A. The auxiliary zone 206A may similarly be inactive and not usable for performing gate operations with one or more qubits. The auxiliary zone 206A may be used only for storage and no other transport operations may be performable for the qubits stored therein. In this regard, the auxiliary zone 206A may further provide storage positions for qubits not utilized for gating in the current time slice. In some embodiments, such auxiliary zones (e.g., the auxiliary zone 206A) are positioned further from the gate zones than the storage zone(s) of the ion trap. In other embodiments, any number of storage and/or auxiliary zones may be located between gate zones and/or on the fringes of the ion trap.

FIG. 3 illustrates a block diagram of an example apparatus for global qubit placement assignment that may be specially configured in accordance with at least some example embodiment of the present disclosure. In some embodiments, the controller of the quantum computing system 102 is embodied by one or more computing systems, such as the apparatus 300 as depicted and described in FIG. 3. The apparatus 300 includes processor 302, memory 304, input/output circuitry 306, communications circuitry 308, and qubit positioning circuitry 310. The apparatus 300 may be configured, using one or more of the sets of circuitry 302, 304, 306, 308, and/or 310, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 300 may provide or supplement the functionality of another particular set of circuitry. For example, the processor 302 in some embodiments provides processing functionality to any of the sets of circuitry, the memory 304 provides storage functionality to any of the sets of circuitry, the communications circuitry 308 provides network interface functionality to any of the sets of circuitry, and/or the like.

In some embodiments, the processor 302 (and/or co-processor or any other processing circuitry assisting or otherwise associated with the processor) may be in communication with the memory 304 via a bus for passing information among components of the apparatus 300. In some embodiments, for example, the memory 304 is non-transitory and may include, for example, one or more volatile and/or non-volatile memories. In other words, for example, the memory 304 in some embodiments includes or embodies an electronic storage device (e.g., a computer readable storage medium). In some embodiments, the memory 304 is configured to store information, data, content, applications, instructions, or the like, for enabling the apparatus 300 to carry out various functions in accordance with example embodiments of the present disclosure.

The processor 302 may be embodied in a number of different ways. For example, in some example embodiments, the processor 302 includes one or more processing devices configured to perform independently. Additionally or alternatively, in some embodiments, the processor 302 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the apparatus 300, and/or one or more remote or "cloud" processor(s) external to the apparatus 300.

In an example embodiment, the processor 302 may be configured to execute instructions stored in the memory 304 or otherwise accessible to the processor. Alternatively or additionally, the processor 302 in some embodiments is configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively or additionally, as another example in some example embodiments, when the processor 302 is embodied as an executor of software instructions, the instructions may specifically configure the processor 302 to perform the algorithms embodied in the specific operations described herein when such instructions are executed.

As one particular example, the processor 302 may be configured to perform various operations associated with improved global qubit placement assignment, for example as described with respect to operation of the quantum computing system 102 and/or as described further herein. In some embodiments, the processor 302 includes hardware, software, firmware, and/or a combination thereof, that receives and/or otherwise identifies a quantum program. The quantum program may be associated with or represented by a qubit grouping set performable over one or more time slices. Additionally or alternatively, in some embodiments, the processor 302 includes hardware, software, firmware, and/or a combination thereof, that generates one or more initial layered graph(s) based on the qubit grouping set. Additionally or alternatively, in some embodiments the processor 302 includes hardware, software, firmware, and/or a combination thereof, that generates efficient layered graph(s) by transforming one or more initial layered graph(s) utilizing a graph processing algorithm. Additionally or alternatively still, in some embodiments, the processor 302 includes hardware, software, firmware, and/or a combination thereof, that determines a qubit position arrangement for a qubit set based on the generated efficient layered graph(s).

In some embodiments, the apparatus 300 includes input/output circuitry 306 that may, in turn, be in communication with processor 302 to provide output to the user and, in some embodiments, to receive an indication of a user input. The input/output circuitry 306 may comprise one or more user interface(s) and may include a display that may comprise the interface(s) rendered as a web user interface, an application user interface, a user device, a backend system, or the like. In some embodiments, the input/output circuitry 306 may also include a keyboard, a mouse, a joystick, a touch screen, touch areas, soft keys a microphone, a speaker, or other input/output mechanisms. The processor 302 and/or input/output circuitry 306 comprising the processor may be configured to control one or more functions of one or more user interface elements through computer program instructions (e.g., software and/or firmware) stored on a memory accessible to the processor (e.g., memory 304, and/or the like). In some embodiments, the input/output circuitry 306 includes or utilizes a user-facing application to provide input/output functionality to a client device and/or other display associated with a user.

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 308 may include circuitry for interacting with the antenna(s) and/or other hardware or software to cause transmission of signals via the antenna(s) or to handle receipt of signals received via the antenna(s). In some embodiments, the communications circuitry 308 enables transmission to and/or receipt of data from a client device in communication with the apparatus 300.

The qubit positioning circuitry 310 includes hardware, software, firmware, and/or a combination thereof, that supports various functionality associated with efficient global qubit placement. For example, in some embodiments, the qubit positioning circuitry 310 includes hardware, software, firmware, and/or a combination thereof, for identifying a qubit grouping set representing a quantum program associated with a qubit set. Additionally or alternatively, in some embodiments, the qubit positioning circuitry 310 includes hardware, software, firmware, and/or a combination thereof, for generating one or more initial layered graphs, each including a node set and an edge set arranged into one or more layers representing one or more time slices. In some such embodiments, the qubit positioning circuitry 310 includes hardware, software, firmware, and/or a combination thereof, for generating various initial starting layers, for example one or more randomized initial starting layers. Additionally or alternatively, in some embodiments, the qubit positioning circuitry 310 includes hardware, software, firmware, and/or a combination thereof, for generating an efficient layered graph by transforming each of the initial layered graphs utilizing a graph processing algorithm to reduce the number of edge crossings in the initial layered graph. Additionally or alternatively, in some embodiments, the qubit positioning circuitry 310 includes hardware, software, firmware, and/or a combination thereof, for determining a qubit position arrangement for the qubit set based at least in part on the efficient layered graphs, such as by selecting the efficient layered graph associated with the minimal edge crossings. Additionally or alternatively, in some embodiments, the qubit positioning circuitry 310 includes hardware, software, firmware, and/or a combination thereof, for executing a set of qubit manipulation instructions based at least on the qubit position arrangement to reposition the qubit set within a quantum computing environment. For example, the qubit positioning circuitry 310 may be configured for repositioning the qubits as necessary for gating across one or more time slices, based on odd-even transposition sort.

It should be appreciated that, in some embodiments, qubit positioning circuitry 310 may include a separate processor, specially configured field programmable gate array (FPGA), or a specially programmed application specific integrated circuit (ASIC). Additionally or alternatively, in some embodiments, one or more of the sets of circuitries 302-310 are combinable. Alternatively or additionally, in some embodiments, one or more of the sets of circuitry perform some or all of the functionality described associated with another component. For example, in some embodiments, one or more of the sets of circuitry 302-310 are combined into a single module embodied in hardware, software, firmware, and/or a combination thereof. Similarly, in some embodiments, one or more of the sets of circuitry, for example qubit positioning circuitry 310 is combined such that the processor 302 performs one or more of the operations described above with respect to each of these modules.

Example Data Visualizations of the Present Disclosure

Having described example system and apparatus architectures in accordance with the present disclosure, example visualizations of data maintained and/or processed in accordance with the present disclosure. It should be appreciated that the data visualizations depicted in each of the following figures may be embodied in any number of a myriad of ways. For example, various embodiments may maintain the depicted data in any number of data objects configured to enable storage and/or manipulation of such data objects to perform the various functionality described herein.

FIG. 4 illustrates an example visualization of a quantum program representing an example qubit grouping set processable in accordance with at least some example embodiments of the present disclosure. As depicted, the visualization of the quantum program 400 depicts qubit groups to be gated to perform the logical operations associated therewith. In this regard, it should be appreciated as described herein that it is preferrable to gate the qubit groups for execution in parallel in a minimal number of time slices.

In the depicted visualization of the quantum program 400, each qubit in a qubit set is depicted, with the lifetime of the qubit depicted along the horizontal axis. In the depicted example, the quantum computing environment includes nine (9) total qubits indexed from zero (0) to eight (8) inclusive. In a circumstance where a first qubit is to be gated with another, second qubit of the qubit set, the first qubit is connected with a vertical line and a box or connector to the life line for the other qubit of the qubit group. The depicted quantum program includes various qubit groups forming a qubit grouping set, including qubit groups 402, 404, 406, 408, 410, 412, 414, 416, 418, 420, 422, and 424. For example, as depicted, a first qubit group 402 is formed of qubit index 0 and qubit index 1. Similarly, a second qubit group 404 is formed of qubit index 3 and qubit index 4. It should be appreciated that, in some embodiments, qubit groups may be required to be gated in the order depicted (e.g., from left-to-right along the life line). For example, in some embodiments, the qubit group 402 is to be gated before any other qubit group involving qubit index 0 or qubit index 1, such as qubit groups 410, 414, and/or 416. In other embodiments, qubit groups may be gated in any order, so long as the qubit groups that share at least one qubit are performed in a manner that satisfies the order of execution defined in the quantum program (e.g., left-to-right order as depicted). In yet other embodiments, qubit groups may be gated in any order arbitrarily, such that the left-to-right constraint as depicted need not be satisfied for any group of qubits (e.g., in circumstances where early execution of a particular gate operation does not affect future operations). For example, in some embodiments, qubit group 418 and/or qubit group 424 (which share qubit index 5) may be gated before qubit group 406 (which also shares qubit index 5).

The depicted qubit grouping set embodies all gate operations to be executed to complete execution of the quantum program 400. In this regard, to perform such gating operations, embodiments of the present disclosure determine a particular global qubit placement (e.g., a qubit position arrangement) that enables repositioning of the qubits for gating via the various qubit groups depicted in a reduced number of parallel time steps. In this regard, the qubit grouping set embodies a constraint of qubits that, during execution of the one or more parallel time slices, are to be repositioned to adjacent positions within gate zones in the quantum computing environment to enable a gate operation to be performed associated with such qubit groups. In some such embodiments, the qubit grouping set is processed via a graph-based approach as described herein to reduce the overall number of time steps required to gate all qubit groups represented in the qubit grouping set.

FIG. 5 illustrates a visualization of an example layered graph corresponding to a quantum program in accordance with at least some example embodiments of the present disclosure. Specifically, FIG. 5 illustrates an example layered graph 500 embodying an initial layered graph corresponding to the qubit grouping set of the quantum program 400. In this regard, the example qubit groups, edges between pairs, and other specific elements of the layered graph 500 are exemplary with respect to the particular quantum program 400. In other embodiments and for processing other quantum programs, the specific nodes and/or edges of the resulting layered graph may differ.

The depicted layered graph 500 includes a plurality of nodes. In this regard, all qubit operations (e.g., single or multi-qubit operations) to be performed are represented in the layered graph 500 as nodes representing vertices of the layered graph 500. As depicted, each node includes the qubit(s) upon which a particular gating operation is to be performed. For example, node 502 represents a two-qubit gate being performed on the qubits q0 (the qubit assigned index 0) and q1 (the qubit assigned index 1). Embodiments may also generate nodes associated with a single qubit index, for example representing gating operations that are to be performed on only a single qubit, or to assign such qubits to arbitrary positions as not involved with any gating operation at the particular time slice (e.g., in a storage location in an auxiliary zone, for example). For example, as depicted, layered graph 500 includes node 504 associated with only qubit q8, which is not involved in any gate operation at time slice 0.

Some embodiments of the present disclosure generate the layered graph 500 in a manner such that each column of nodes represents the qubit positions in a quantum computing environment, for example within a linear QCCD ion trap, at a particular time slice. The horizontal axis represents a time progression across multiple time slices. In this regard, each column represents a set of gate operations that may be performed in parallel during a single time slice. Similarly, once such gate operations are executed, the qubits are rearranged to the positions represented in the next column for execution of subsequent gating operations. In this regard, embodiments generate edges between a node at a first time slice and nodes in the next time slice that share a qubit index. For example, node 502 at time slice index 0 (e.g., a first time slice) is connected via an edge with node 506 at time slice index 1 as such nodes share qubit q0. Similarly, node 502 at time slice 0 is connected via an edge with node 508 at time slice index 1 as such nodes share qubit q1. Each node may be connected to one or more other nodes in the subsequent time slice accordingly until a final time slice is reached and all gating operations of the quantum program have been executed (e.g., at time slice index 3 as depicted).

The layered graph representation serves as a proxy for the positioning and repositioning of qubits in the quantum computing environment to accomplish the execution of all gate operations representing a particular quantum program. In this regard, each edge crossing represents a physical reordering of qubits in the ion trap. Similarly, the overall count of qubit swap operations serves as a proxy for the overall time of execution for transporting the qubits to execute the quantum program. In this regard, the total number of parallel time steps required to execute the quantum program represented by the layered graph is determinable based on the OETS cost for transitioning between the qubit positions represented in each layer of the layered graph. As such, the number of parallel time steps required to rearrange the qubits between positions at each layer may be determined by determining the number of parallel time steps required to complete an instance of the OETS algorithm, and the total number of parallel time steps required to execute the quantum program may be represented as the sum of such parallel time steps for each layer. The total number of swap operations required to be performed to execute the quantum program represented by the layered graph is also determinable as the sum of all swaps performed at each parallel time step of each instance of the OETS algorithm. Alternatively or additionally, the overall swap cost of executing the quantum program is approximated by the number of edge crossings, and similarly reducing the number of edge crossings improves (e.g., by reducing) the overall number of swap operations and/or time steps required to position the qubits in positions that enable all gate operations in the order required to complete execution of the quantum program.

Specifically, the layered graph 500 representation of the quantum program 400 enables determining of global qubit placement as a graph-layout problem. Some embodiments of the present disclosure perform global qubit placement utilizing a cost function that is tied to the number of edge crossings represented in a layered graph representation of a quantum program. In this regard, the layered graph 500 may be processed via one or more graph processing algorithm(s) to attempt to reduce the overall number of edge crossings, thus improving the overall time required for executing the quantum program 400 by minimizing the number of swap operations required to complete all gating operations represented in the quantum program 400. As such, the layered graph 500 represents an initial layered graph (e.g., before processing via one or more graph processing algorithms to improve the overall number of edge crossings).

The depicted layered graph 500 embodies a single example of a layered graph that corresponds to the quantum program 400. The first layer of the layered graph 500—the column of nodes at time slice 0—in fact embodies an arbitrary arrangement of the qubits positioned in the various positions of the ion trap. In other contexts, an alternative first layer may be arranged, and/or one or more alternative subsequent layers may be arranged. One alternative first layer may result in a layered graph that is optimal as compared to other layered graphs representing the same quantum program (e.g., a layered graph having less edge crossings than all other layered graph representations). Some embodiments generate and process various initial graph layers to generate a plurality of alternative efficient layered graphs. Some such embodiments select the efficient layout graph (e.g., after optimization via one or more graph processing algorithm(s)) that best minimizes the cost function utilized by the graph processing algorithm(s).

FIG. 6 illustrates a visualization of operations performed by an example graph processing algorithm in accordance with at least some example embodiments of the present disclosure. Specifically, FIG. 6 depicts a visualization of operations performed for an example implementation of a Sugiyama edge-crossing algorithm for reducing the number of edge crossings between layers. It should be appreciated that as the Sugiyama edge-crossing algorithm executes on an initial layered graph, the initial layered graph is re-arranged to generate a corresponding efficient layered graph. The resulting efficient layered graph may include the same number of edge crossings or a reduced number of edge crossings as compared to the initial layered graph.

As illustrated, the Sugiyama edge-crossing algorithm implementation 600 depicted rearranges the positions of each node by each time slice (e.g., layer-by-layer). In this regard, the Sugiyama edge-crossing algorithm implementation 600 starts from the left most layer and progressively rearranges each subsequent layer (e.g., the next layer to the right) to attempt to reduce the edge crossings at each layer. Such operations may be referred to as a "forward pass" of the layered graph. Upon completing rearrangement of the final layer (e.g., rearrangement of the nodes representing the qubit positions at the final time slice), the Sugiyama edge-crossing algorithm implementation 600 reverses direction and begins repositioning the nodes in each layer in the reverse order. In this regard, the Sugiyama edge-crossing algorithm implementation 600 starts from the right most layer (e.g., the final layer) and progressively rearranges each subsequent layer (e.g., the next layer to the left as depicted) to attempt to reduce the number of edge crossings at each layer. Such operations may be referred to as a "backwards pass" of the layered graph. Upon completing rearrangement of the initial layer (e.g., rearrangement of the nodes representing the qubit positions at the first time slice), the Sugiyama edge-crossing algorithm implementation 600 reverses again and begins a new forward pass. In this regard, forward and/or backwards passes may be repeated until no further improvement to the number of edge crossings are identified. As depicted, for example, the forward pass rearranges the layers $L_0$ through $L_5$ in order of increasing index, and subsequently the backwards pass rearranges the layers $L_5$ through $L_0$ in order of decreasing index, then repeats. Upon completion of the Sugiyama edge-crossing algorithm, a resulting efficient layered graph is generated that reduces or at least keeps the same the number of swap operations to execute all required gate operations of a quantum program.

In some embodiments of the present disclosure, the Sugiyama edge-crossing algorithm is further enhanced to provide additional advantages over conventional, arbitrary implementations of Sugiyama edge-crossing algorithm. In some embodiments, a plurality of additional layered graphs are generated that each include a randomly arranged first layer. In this regard, each of such initial layered graphs may be arranged differently during optimization, thus resulting in a plurality of different efficient layered graphs. In some embodiments, the plurality of efficient layered graphs are processed to determine the optimal efficient layered graph therefrom (e.g., the efficient layered graph associated with the minimal cost according to a particular cost function utilized by the graph processing algorithm to generate the plurality of efficient layered graphs). The optimal efficient layered graph may be selected to increase the likelihood that the selected efficient layered graph embodies a global minimum and avoids circumstances where the Sugiyama edge-crossing algorithm ends up getting stuck in local minima.

Additionally or alternatively, in some embodiments, the minimal cost is recorded for a particular layered graph as it is rearranged. The configuration of the layered graph that is associated with the minimal cost may be tracked and/or recorded, such that it may be compared with the cost associated with subsequent iterations of the rearranged layered graph, and/or subsequent costs for different iterations of the layered graph. Some embodiments limit the number of steps that do not make progress in reducing the number of edge crossings in the layered graph to a maximum threshold number of steps without improvement in the overall cost. Once the number of steps that do not make progress is reached, the best recorded layered graph arrangement (e.g., the layered graph associated with the minimal cost of all the determined costs) is selected for use in generating the qubit position arrangement. Utilizing the threshold number of steps without improvement, such embodiments avoid detriments of lacking monotonic convergence, and avoid oscillating around the ultimate solution. Attempts may be performed iteratively until a threshold number of attempts have been completed, and/or until a threshold number of attempts have been completed without further improvement in the layered graph configuration with the minimal recorded cost.

In some embodiments, the graph processing algorithm utilizes one or more sub-processes. For example, in some embodiments, the graph processing algorithm utilizes and/or otherwise relies on a particular sub-process that determines values for nodes within a layer to be used for repositioning (e.g., by "ranking" each node and repositioning based on the ranks). In this regard, the graph processing algorithm may include any number of node reorganization steps, with each node reorganization leveraging one or more of such sub-processes to reorganize nodes to reduce edge crossings where possible.

FIG. 7 illustrates an example node reorganization step of an example graph processing algorithm in accordance with at least some example embodiments of the present disclosure. Specifically, FIG. 7 depicts a node reorganization step that utilizes a barycenter heuristic to determine how to rearrange nodes within each layer during execution of the Sugiyama edge-crossing algorithm (or other graph processing algorithm) as depicted and described. It should be appreciated that the barycenter heuristic implementation depicted and described is one non-limiting example of a sub-process for reorganizing nodes, and in other embodiments any other heuristic, algorithm, and/or sub-process may be utilized that performs rearrangement of the nodes.

As depicted, the barycenter heuristic computes a target position for a particular node associated with one or more qubit index/indices by adding the positions of each qubit in the previous layer to determine a first value, and dividing that first value by the number of edges connecting the node to nodes of the previous layer. In this regard, the barycenter heuristic may be formally defined by the formula:

$$P_n = \frac{1}{E}\sum_e^E P_e^{n-1},$$

where $P_n$ is the position of a node in layer N, E is the number of edges connecting a given node to node(s) in the previous layer, and $P_e^{n-1}$ is the position of the qubit index in the previous layer.

FIG. 7 depicts example reorganization of a layer $L_N$ in layered graph 700. In this regard, the layer $L_N$ of layered graph 500 includes several nodes, specifically nodes 702A, 702B, and 702C. The nodes are arranged such that node 702A resides in position index 0, node 702B resides in position index 1, and node 702C resides in position index 2.

The arrangement of nodes may be entirely arbitrary, randomly generated, generated utilizing a defined process (e.g., a process that attempts to minimize the number of edge crossings in the initial arrangement), and/or the like.

The barycenter heuristic is applied to each of the nodes 702A, 702B, and 702C for repositioning. In this regard, the barycenter calculation 706A corresponds to node 702A, the barycenter calculation 706B corresponds to node 702B, and the barycenter calculation 706C corresponds to node 702C. As depicted, node 702A is associated with qubit indices 2 and 1. Such qubit indices are represented in the nodes 704A and 704B in the previous layer $L_{N-1}$, which are positioned at position indices 0 and 1 respectively. These positions are represented in the numerator of the barycenter calculation 706A. Further, node 702A is connected by two edges to the nodes 704A and 704B in the previous layer $L_{N-1}$, which is represented in the denominator of the barycenter calculation 706A. Thus, the resulting value for the barycenter calculation 706A corresponding to node 702A is represented by $P_0$=0.5.

Similarly, as depicted, node 702B is associated with qubit indices 0 and 3. Such qubit indices are both represented in node 704C in the previous layer $L_{N-1}$, which is positioned at position index 2. This position is represented in the numerator of the barycenter calculation 706B. Further, node 702B is connected only by one edge to the node 704C in the previous layer $L_{N-1}$, which is represented in the denominator of the barycenter calculation 706B. Thus, the resulting value for the barycenter calculation 706B corresponding to node 702B is represented by $P_1$=2. Node 702C is associated with qubit indices 4 and 5. Such qubit indices are represented in nodes 704A and 704B in the previous layer $L_{N-1}$, which are positioned at position indices 0 and 1 respectively. These positions are represented in the numerator of the barycenter calculation 706C. Further, node 702C is connected by two edges to nodes 704A and 704B in the previous layer $L_{N-1}$, which is represented in the denominator of the barycenter calculation 706C. Thus, the resulting value for the barycenter calculation 706C corresponding to node 702C is represented by $P_2$=0.5.

Upon completing all barycenter calculations for nodes of a particular layer, the nodes are rearranged based on the values of such barycenter calculations. In some embodiments, the nodes are rearranged based on the positions represented by the values of the barycenter calculation. FIG. 7 depicts the rearranged layered graph 750, which includes rearranged nodes of layer $L_N$. In particular, node 702A remains in position index 0, node 702C is moved to position index 1, and node 702B is moved to position index 2. Node 702B is associated with a position value resulting from the barycenter calculation 706B of 2, whereas both node 702A and node 702C are associated with values resulting from the barycenter calculations 706A and 706C respectively of 0.5. In some embodiments, the particular arrangement of the layer $L_N$ in the rearranged layered graph 750 is generated by arranging the position values resulting from the barycenter calculations in numerical order. In some embodiments, the nodes 702A and 702C that are associated with equal values resulting from the barycenter calculations may be arranged arbitrarily, randomly, or otherwise in any order.

In some embodiments, the barycenter heuristic may be modified to eliminate ties between values for various nodes. For example, in some embodiments, the barycenter heuristic is modified by adding a random element that perturbs the nodes having equal rank, while leaving the rank of the value with respect to ranks of the other nodes unaffected. In this regard, the modified barycenter heuristic leveraging the random element may be formally described by the formula:

$$P_n = \frac{1}{E}\sum_e^E P_e^{n-1} + rnd(-0.1, 0.1)$$

In this regard, a random element is generated using a random number generator rnd(a, b) configured to generate a random number between a and b. In the illustrated example, a=−b=0.1. Thus, in the illustrated embodiment, the random element generated by the random number generator is relatively small, so as to produce a non-deterministic placement of the nodes while enabling the same rank with respect to the remaining nodes. Moreover, the random element is selected such that over a plurality of selections the random element average to zero, such that the noise added to the determination by the random element substantially cancels itself out over the performance of multiple passes. Utilizing the modified barycenter heuristic with the small random element further provides technical advantages by enabling such embodiments to explore more of the state space as a plurality of arrangements are generated, thus resulting in determination and/or selection of a particular arrangement providing a better overall solution.

The cost function of the graph processing algorithm may be defined as the overall number of edge crossings in the layered graph during rearrangement. The number of edge crossings serve as a proxy for the physical reordering of qubits in the ion trap. In this regard, the graph processing algorithm is performed with a goal objective to minimize the cost function. In some embodiments, the cost function is further improved upon by considering the OETS cost as a primary cost factor, and the overall number of swap operations as a secondary cost factor. The OETS cost captures the number of parallel swap operations required to execute all gate operations of a quantum program. As the number of parallel swap operations is directly linked to the execution time to the quantum program, minimizing such operations reduce the overall execution time of the quantum program. The cost of the overall number of swap operations captures the execution of each individual swap. In this regard, by reducing the cost of the overall number of swap operations, the overall amount of computing resources required to execute the quantum program may be further reduced. Thus, the OETS may be used to select a particular layered graph representing embodying a solution with a preferred arrangement of nodes, and in circumstances where two solutions have equal OETS cost, the solution with the fewer overall number of swap steps is selected to minimize the execution time and overall computing resources required for execution.

FIG. 8 illustrates visualizations of an example layered graph reorganized via an example graph processing algorithm in accordance with at least some example embodiments of the present disclosure. Specifically, FIG. 8 illustrates an initial layered graph 800 rearranged utilizing a graph processing algorithm embodying a Sugiyama edge-crossing algorithm that utilizes the modified barycenter heuristic including a random element. As depicted, the initial layered graph 800 may be completed in 21 time steps (e.g., an OETS cost of 21 parallel swap operations) and 51 overall swap commands (e.g., a total number of swaps performed in all completing the OETS transition between each layer). Utilizing one or more iterations of the graph processing algorithm, the efficient layered graph 850 is selected with a reduced cost of 4 time steps and 7 overall swap commands. In this regard, the efficient layered graph 850 determined may be performed with reduced execution time and computing resources, resulting in a faster execution time, reduced error likelihood, and improved associated costs.

Example Processes for Extended Qubit Environments

Having described example system, apparatus architectures, and data visualizations in accordance with the present disclosure, example processes for enabling efficient global qubit placement in extended qubit environments (e.g., quantum computing environments having more than twice as many qubits as gate zones) will now be discussed. The various example contexts described above perform particularly well in circumstances where the quantum computing environment includes at most twice as many qubits as active gate zones. In circumstances where this distribution of gate zones to qubits is not met, additional processes may be applied to improve the overall throughput of such embodiments (e.g., reduce the overall execution time, reduce the amount of computing resources required to execute the quantum program, and/or the like).

In some embodiments, efficient qubit placement is performed in the manner described above, and one or more slider commands are determined and/or performed to enable the gates to be executed. FIG. 9 illustrates visualizations of slide command implementations in accordance with at least some example embodiments of the present disclosure. Each slide command may reposition the qubits in a particular direction, such that at least one qubit in a gate zone is replaced with a new qubit such that activation of the gate zone performs a logical operation for the new two qubits in the gate zone. As shown in FIG. 9, execution of a slide command causes transportation of all of the qubits in the same direction such that no qubit switching occurs during execution of a slide command.

As depicted, for example, the example quantum computing environment 900 depicted in FIG. 9 includes 16 total qubits. The example quantum computing environment 900 further includes only 4 active gate ones (each denoted by the letter "G" and tinted in gray). The example quantum computing environment 900 further includes multiple storage and auxiliary zones for storing qubits not currently being gated (each denoted by the letters "A" and "S"). In this regard, the quantum computing environment 900 includes a number of qubits that is more than twice the number of active gate zones.

Each slide command requires an additional parallel time step, during which time each qubit "slides" by moving one position in a particular direction. It should be appreciated that qubits may be manipulated to execute a slide command in any of a myriad of manners. For example, the hardware of the quantum computer is initiated to cause a linear shift of the entire population of qubits to the right or left by one or more position.

As depicted, at a first time step 902, a first set of qubits are positioned for gating in each of the gate zones. The first set of qubits includes a first qubit group of qubits 910A and 910B in a first storage zone, and a second qubit group of qubits 912A and 912B. As such, a first gate operation may be performed based on the qubits 912A and 912B within the particular gate zone. The qubit group formed by qubits 910A and 910B cannot be utilized to execute a gate operation since the qubits are not positioned within an active gate zone.

At time step 904, a first slide command is executed that slides each of the qubits by one position in a particular direction (for example, to the right as depicted). In this regard, the qubits are repositioned such that a new pair of qubits falls within each gate zone. As depicted, upon execution of the first slide command, qubits 910B and 912A are positioned within the gate zone, and qubit 912B is moved into the subsequent storage zone and can no longer be gated. As such, a gate operation may be performed based on the qubits 910B and 912A within the particular gate zone.

At time step 906, a second slide command is executed that again slides each of the qubits by one position in the same direction. In this regard, the qubits are again repositioned such that a new pair of qubits falls within each gate zone. As depicted, upon execution of the second slide command, qubits 910A and 910B are positioned within the gate zone, and qubits 912A and 912B have both been moved to the subsequent storage zone. As such, a gate operation may be performed based on the qubits 910A and 910B that remain within the particular gate zone.

It should be appreciated that, in this regard, one or more slide command(s) may be performed to enable gate operations to be performed for each combination of adjacent qubits in a particular qubit set. In this regard, qubits may be arranged such that they are positioned next to their counterpart for gating at a particular time, and slide commands may be identified and/or inserted to enable the gating of all qubit groups based on the current arrangement of qubits. Alternatively or additionally, in circumstances where a slide command is executed by the resulting arrangement of repositioned qubits does not include any qubit groups that are to be gated for a particular quantum program, no gating may be performed for the particular time step to further reduce the execution time required to perform all gating operations.

Slide commands may be performed for qubits arranged into positions as though there are enough gate zones for all qubits to be performed in parallel. Gating is then performed in stages, which may be considered to include even stages (e.g., where the lower index of each gate zone includes a qubit originally positioned at an even position) and odd stages (e.g., where the lower index of each gate zone includes a qubit originally positioned at an odd position). In this regard, all qubit groups positioned adjacent to one another in the original arrangement of qubits may be performed at the first even stage, a subsequent odd stage, or a subsequent even stage. Utilizing slide commands, global position arrangement may be extended well up to four times the number of qubits compared to the number of gate zones, and more if additional storage zones are present in the quantum computing environment.

Alternatively or additionally, in some embodiments, graph squeezing utilized to perform such graph-based efficient global qubit position arrangement. Such graph squeezing may be performed to account for the particular number of gate zones within a quantum computing environment.

Graph squeezing arranges the layered graph such that the maximum number of gates performed in parallel are scheduled in a first layer. Subsequently, gates that are required but cannot be performed due to the limited number of gate zones are "squeezed" by advancing such gate operations to a subsequent time slice. By advancing the pairs that cannot be performed in parallel to a subsequent time slice, the resulting layered graph is reformed to ensure all gate operations may be performed. The reformed layered graph may thereby be processed via the graph processing algorithm to reduce the overall execution time of the quantum program while maintaining the ability to perform all needed gate operations. In this regard, the gate squeezing performed for a particular quantum program may embody a preprocessing step for a particular set of positions based on an additional input representing the qubit positions that allow gate operations to be performed (e.g., positions corresponding to active gate zones). The remaining positions may correspond to any zone for storing qubits not utilized in gate operations of the current time step (e.g., storage and/or auxiliary zones).

FIG. 10 illustrates example visualizations of graph squeezing in accordance with at least some example embodiments of the present disclosure. Specifically, FIG. 10 illustrates graph squeezing of an example graph 1000 to account for two different sets of positions that may be utilized for gating. As depicted, the various layered graphs are depicted as a matrix (e.g., each index of the horizontal axis represents a layer of the graph and each index of the vertical axis represents a position in the quantum computing environment). Each matrix includes a shaded portion representing the positions that may be utilized for gating, and the remaining non-shaded portions represent positions that may be utilized for storing qubits in the interim. It should be appreciated that the graph processing algorithm may be modified to represent such a constraint based on an additional input that defines the qubit positions that allow gating.

Layered graph 1000 represents qubit positions arranged in a circumstance where qubit gating positions set 1002 representing all 9 positions of a particular quantum computing environment may be utilized for gating (e.g., represented by shading of the entirety of the layered graph 1000). Qubit groups to be gated at each time step are indicated by a border that surrounds each number representation of the qubit group. In this regard, as depicted, at the layer qubit groups of (0, 1), (3, 4), (2, 5), and (6, 7) are gated. At a layer qubit groups of (0, 3), (1, 4), and (7, 8) are gated, and so on for the subsequent layers. In total, the qubit groups may be performed in a total of 4 time steps and 7 total swap operations.

The qubits and/or qubit groups squeezed to a subsequent time step may be selected utilizing any of a myriad of mechanisms. In some embodiments, the qubits and/or qubit groups to be squeezed to a subsequent time step is/are selected arbitrarily. In some embodiments, the qubits and/or qubit groups to be squeezed to a subsequent time step is/are selected at random. In some other embodiments, the qubits and/or qubit groups to be squeezed to a subsequent time step is/are selected based on their current positions. In yet other embodiments, the qubits and/or qubit groups to be squeezed to a subsequent time step is/are selected based on any other determinable heuristic and/or algorithm.

To limit the gating only to qubit gating positions set 1012, graph squeezing may be performed resulting in the layered graph 1010. As depicted in the layered graph 1010, the number of time steps required has increased to account for the decreased number of positions available for gating. The qubit position arrangement changes based on the resulting selected efficient layered graph that satisfies the performance of the gate operations that can no longer be performed in each layer. For example, as depicted, the gating operations of two qubit groups can no longer fit in the first layer, and must be "squeezed" out to a subsequent layer and time step. Accordingly, the layered graph is reprocessed to account for such squeezing. In this regard, the layered graph 1010 represents an efficient layered graph selected for performing all gate operations after graph squeezing based on the constraint of the gating positions being limited to the qubit gating positions set 1012. In total, gating of the qubit groups may be performed in a total of 16 time steps and 42 total swap operations based on the limited qubits gating positions set 1012.

Alternatively, to limit gating only to qubit gating positions set 1022, graph squeezing may be performed resulting in the layered graph 1020. As depicted in layered graph 1020, the number of time steps required has further increased for the decreased number of positions available for gating. Again, the qubit position arrangement changes accordingly based on the resulting selected efficient layered graph that satisfies the performance of the gate operations that can no longer be performed in the position index 6. The resulting number of layers does not change, however the overall circuit execution time for the quantum program increases slightly. In this regard, the layered graph 1020 represents the efficient layered graph selected for performing all gate operations after graph squeezing based on the constraint of the gating positions being limited to qubits gating positions set 1022. In total, gating of the qubit groups may be performed in a total of 17 time steps and 43 total swap operations based on the limited qubits gating positions set 1022.

It should be appreciated that graph squeezing or slide commands may be utilized to account for any decrease in the number of gating zones/positions. In this regard, both may be determined and the process resulting in less execution time (e.g., lower time steps and/or lower total swap operations) may be utilized. In other contexts where one of the processes may not be possible, for example where slide commands are not possible due to the number of positions and qubits, the alternative solution may be utilized by default. Utilizing either such implementations or a combination thereof, embodiments of the present disclosure reduce the required execution time in circumstances where the number of qubits is more than double the number of gate zones and/or the number of gating positions is less than the number of qubits.

Extension of Graph-Based Global Qubit Position Placement to Loop Architectures

The various descriptions above with respect to linear positions and graph representations function well in linear quantum computing environments (e.g., quantum computers including a linear ion trap). In other contexts, graph-based global qubit placement may similarly be performed for other architectures. For example, in some embodiments, loop architectures are utilized within a particular quantum computing environment. Application of the principles described herein with respect to the linear architecture to a loop architecture will now be described herein. In this regard, it should be appreciated that graph-based global qubit placement may be performed for any type of quantum computing environment and hardware architecture.

FIG. 11 illustrates an example loop quantum computing environment that may be utilized within a quantum computer in accordance with at least some example embodiments of the present disclosure. Specifically, FIG. 11 illustrates an example QCCD ion trap 1100 ("ion trap 1100") representing a loop quantum computing environment. The ion trap 1100 may be configured to manipulate, store, and/or otherwise interact with one or more qubits as depicted and described for gating in accordance with one or more quantum programs. Non-limiting example implementation details of the loop ion trap 1100 are described in U.S. Patent Application 63/199,279, titled "Apparatuses, Systems, and Methods for Elliptical Atomic Object Traps," filed Dec. 17, 2020, the contents of which are incorporated by reference herein in their entirety.

As illustrated, the ion trap 1100 includes a plurality of gate zones 1102A-1102D located at a first portion of the loop architecture (e.g., an upper part as depicted), and a plurality of gate zones 1104A-1104D located at a second portion of the loop architecture (e.g., a lower part as depicted). A storage zone may be located between such gate zones

1102A-1102D and/or 1104A-1104D. The ion trap 1100 further includes connector portions 1106A and 1106B that connect the upper and lower portion of gate zones. The connector portions 1106A and 1106B may include any number of storage and/or auxiliary zones for storing qubits. Further, the connector portions 1106A and 1106B enable qubits to be moved from the upper portion to the lower portion, and/or from the lower portion to the upper portion. In this regard, the ion trap 1100 may be considered as two linear traps connected at both ends via the connector portions 1106A and 1106B. It should be appreciated that qubits within the ion trap 1100 may be repositioned around the loop, on each side independently, and/or otherwise in the various zones in any manner that enables efficient execution of the gate operations.

Whereas the linear architecture may be modeled as a two-dimensional graph, the loop architecture may similarly be modeled via a three-dimensional graph (e.g., on a two-dimensional manifold or surface in a three-dimensional space). FIG. 12 illustrates an example visualization of an example layered graph corresponding to a quantum program within a quantum computer embodying a loop quantum computing environment in accordance with at least some example embodiments of the present disclosure. Specifically, FIG. 12 depicts positions of the loop topology modeled as a layered graph 1200 on the surface of a three-dimensional cylinder.

The layered graph 1200 represents layers of the graph (e.g., time slices) along the length of the cylinder. As depicted, the layered graph 1200 includes a first layer 1202A associated with a first time step and a second layer 1202B associated with a second time step. In this regard, positions represented along the circumference of the cylinder at a particular location along the length correspond to the positions of such qubits at a particular layer. As depicted, a first layer includes node 1204A at a first position at the first layer, node 1204B at a second position at the first layer, and a third position at the first layer. Such positions may be located on one side of the loop ion trap, both sides of the loop ion trap, and/or the like. Similarly, a second layer includes nodes 1206A, 1206B, 1206C, and 1206D. The nodes sharing at least one represented position index are connected with edges between the layers.

The layered graph 1200 representing the loop ion trap may be processed similarly to linear layered graphs. In this regard, a graph processing algorithm may iteratively plan and/or rearrange the layered graph 1200 in accordance with the time progression (e.g., from left to right). The routing cost for such loop architectures remains the total number of time steps. In such loop contexts, the actual routing algorithm may depend on a modified parallel OETS that functions for the loop topology (e.g., where the loop enables what would be edge positions in the linear architecture to be swapped due to the nature of the loop architecture). In this regard, the OETS cost may differ due to enhancements in the ability to move the qubits around the loop architecture.

Example Processes of the Disclosure

Having described example systems, apparatuses, computing environments, and data visualizations of the disclosure, example processes in accordance with the present disclosure will now be described. It will be appreciated that each of the flowcharts depicts an example computer-implemented process that may be performed by one or more of the apparatuses, systems, devices, and/or computer program products described herein, for example utilizing one or more of the specially configured components thereof.

The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 13 illustrates operations of an example process for improved global qubit placement in accordance with at least some example embodiments of the present disclosure. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 300 alone or in communication with one or more other component(s), device(s), system(s), and/or the like. In this regard, in some such embodiments, the apparatus 300 is specially configured by computer-coded instructions (e.g., computer program instructions) stored thereon, for example in the memory 304 and/or another component depicted and/or described herein and/or otherwise accessible to the apparatus 300, for performing the operations as depicted and described. In some embodiments, the apparatus 300 is in communication with one or more external apparatus(es), system(s), device(s), and/or the like, to perform one or more of the operations as depicted and described. For purposes of simplifying the description, the process 1300 is described as performed by and from the perspective of the apparatus 300.

The process 1300 begins at operation 1302. At operation 1302, the apparatus 300 includes means, such as the qubit positioning circuitry 310, the communications circuitry 308, the input/output circuitry 306, the processor 302, and/or the like, or a combination thereof, to identify a qubit grouping set representing a quantum program associated with a qubit set. The qubit grouping set may represent various gate operations to be performed on one or more qubits. In this regard, the qubit grouping set may include data representing a qubit group with only one qubit (e.g., unpaired with any other qubit) to be gated for a unary logical operation. The qubit grouping set may be parsed and/or otherwise generated from a quantum program inputted and/or otherwise received. Alternatively or additionally, in some embodiments the qubit grouping set is received or input directly. It should be appreciated that in some embodiments the qubit grouping set may be ordered such that a gate operations occur in accordance with a particular desired order.

At operation 1304, the apparatus 300 includes means, such as the qubit positioning circuitry 310, the communications circuitry 308, the input/output circuitry 306, the processor 302, and/or the like, or a combination thereof, to generate an initial layered graph comprising a node set and an edge set arranged into one or more layers representing one or more time slices. Each node of the node set may represent a qubit group of the qubit grouping set to be gated (e.g., a single node or a pair of nodes that should be moved to adjacent positions for gating). Each edge of the edge set may connect a first node in a first layer to a second node in a second layer. In this regard, the edges may connect a first node that includes or otherwise is associated with a first qubit index with a second node that similarly includes or otherwise is associated with the first qubit index, thus connecting nodes that share represented qubit indices. For example, the first node may also include or otherwise be associated with a second qubit index and the second node (or a different, third node) in the second layer may similarly be associated with the second qubit index, and thus the first and second node may be connected by an edge of the edge set. Such edges may be created for each qubit index between nodes of the first layer and nodes of the second layer. In circumstances where a node is associated with a single qubit index, one edge may extend from the node to another node of each of the prior and/or subsequent layer. In circumstances where a node is associated with a qubit group of two qubit indices, two edges may extend from the node to other nodes of each of the prior and/or subsequent layer.

In some embodiments, the initial layered graph comprises a two-dimensional graph, for example as depicted and described herein. In other embodiments, the initial layered graph comprises a three-dimensional graph and/or a graph defined on a two-dimensional manifold in three-dimensional space, for example as depicted and described herein. In some such embodiments, the dimensionality of the graph may depend on the underlying hardware architecture underlying the quantum computing environment in which the qubits are to be gated.

At operation 1306, the apparatus 300 includes means, such as the qubit positioning circuitry 310, the communications circuitry 308, the input/output circuitry 306, the processor 302, and/or the like, or a combination thereof, to generate an efficient layered graph by transforming the initial layered graph utilizing a graph processing algorithm. The graph processing algorithm may adjust the position indices of one or more nodes in various layer(s) of the layered graph in an effort to minimize a cost function utilized by the graph processing algorithm. In some such embodiments, the graph processing algorithm reduces the number of edge crossings in the initial layered graph. The graph processing algorithm may rely on a cost function that utilizes any number of cost factors, for example just a single cost factor, a primary cost factor and a secondary cost factor, and/or the like. The graph processing algorithm may utilize one or more sub-processes that rank and/or otherwise determine how to rearrange nodes of each layer. Non-limiting examples of the graph processing algorithm includes implementations of Sugiyama edge-crossing algorithm utilizing one or more node rearrangement algorithms, such as the modified barycenter heuristic, as described herein.

In some embodiments, the apparatus 300 generates a plurality of initial layered graphs and/or corresponding efficient layered graphs. For example, the apparatus 300 may generate initial layered graphs each with a randomized first layer and iteratively build out the initial layered graph starting from the randomized first layer to yield the complete initial layered graph. Each initial layered graph may subsequently be processed utilizing a graph processing algorithm to generate a corresponding efficient layered graph, the efficient layered graph having a reduced cost function based on operation of the graph processing algorithm. In this regard, the apparatus 300 may track and/or otherwise select the efficient layered graph that yields the lowest overall cost function for further processing.

In some embodiments, the apparatus 300 performs graph squeezing of the initial layered graph and/or efficient layered graph. In this regard, the initial layered graph and/or efficient layered graph may be updated to account for a limited set of positions that may be utilized for gating. In some embodiments, the graph processing algorithm takes as an input the positions active for gating such that graph squeezing of the initial layered graph may be executed.

At operation 1308, the apparatus 300 includes means, such as the qubit positioning circuitry 310, the communications circuitry 308, the input/output circuitry 306, the processor 302, and/or the like, or a combination thereof, to determine a qubit position arrangement for the qubit set based at least in part on the efficient layered graph. In this regard, the efficient layered graph may represent the position for each qubit index at each time slice for gating. The first layer may correspond to an initial qubit position arrangement at a first time step. In this regard, each subsequent layer represents the target qubit position arrangement for each subsequent time step for gating.

In this regard, the qubit position arrangement may indicate the position index at which each qubit is to be located for each time slice required to execute a quantum program. The qubit position arrangement may include sub-arrangements that each represent the positions index for each qubit at a particular time slice. Utilizing swap operations determined via the routing algorithm, for example OETS to determine which qubits should be swapped, qubits arranged in accordance with a first sub-arrangement representing a first layer may be rearranged to their subsequent positions for a next, second sub-arrangement representing a second layer. Accordingly, OETS may be performed to determine the swap operations to be performed for transitioning between each sub-arrangement in the qubit position arrangement.

At optional operation 1310, the apparatus 300 includes means, such as the qubit positioning circuitry 310, the communications circuitry 308, the input/output circuitry 306, the processor 302, and/or the like, or a combination thereof, to execute a set of qubit manipulation instructions based at least on the qubit position arrangement to reposition the qubit set within a quantum computing environment. For example, in some embodiments, the apparatus 300 initiates commands representing the set of qubit manipulation instructions to qubit manipulation hardware of the quantum computing environment. Such commands cause the qubits to be physically repositioned within the quantum computing environment, and/or cause gate operations to be invoked based on qubits in the gating zone(s) of the quantum computing environment. In this regard, execution of the set of qubit manipulation instructions causes execution of the quantum program in the reduced number of operations based on the qubit position arrangement determined via the efficient layered graph. In an example embodiment, the apparatus 300 is a client device 104 and provides the qubit position arrangement such that quantum computing system 102 (e.g., a controller of the quantum computing system) receives the qubit position arrangement and generates the set of qubit manipulation instructions and causes execution thereof. In some embodiments, for example, the set of qubit manipulation instructions includes instructions embodying swap operations for transitioning between each sub-arrangement represented in the qubit position arrangement, instructions embodying initiation of gate operations (e.g., to read one or more qubits within the gate zones of a quantum computer), slide operations to linearly slide all qubits one or more position left or right, and/or the like as necessary to execute the quantum program based on the qubit position arrangement, FIG. 14 illustrates additional operations of an example process for improved global qubit placement based on a plurality of attempted initial qubit placements in accordance with at least some example embodiments of the present disclosure. Specifically, FIG. 14 depicts operations of an example process 1400. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as the apparatus 300 alone or in communication with one or more other component(s), device(s), system (s), and/or the like. In this regard, in some such embodiments, the apparatus 300 is specially configured by computer-coded instructions (e.g., computer program instructions) stored thereon, for example in the memory 304 and/or another component depicted and/or described herein and/or otherwise accessible to the apparatus 300, for performing the operations as depicted and described. In some embodiments, the apparatus 300 is in communication with one or more external apparatus(es), system(s), device(s), and/or the like, to perform one or more of the operations as depicted and described. For purposes of simplifying the description, the process 1400 is described as performed by and from the perspective of the apparatus 300.

The process 1400 begins at operation 1402. In some embodiments, the process 1400 begins after one or more operations depicted and/or described with respect to any of the other processes described herein. For example, in some embodiments as depicted, the process 1400 begins after execution of operation 1304. In this regard, some or all of the process 1400 may replace or supplement one or more blocks depicted and/or described with respect to any of the other processes described herein. For example, in some embodiments as depicted, the process 1400 supplants, supplements, and/or otherwise replaces the operation 1306. Additionally or alternatively, as depicted, upon completion of the process 1400, flow may return to one or more operations of another process. For example, as depicted, flow may return to operation 1308 as depicted and described.

At operation 1402, the apparatus 300 includes means, such as the qubit positioning circuitry 310, the communications circuitry 308, the input/output circuitry 306, the processor 302, and/or the like, or a combination thereof, to generate at least one additional initial layered graph. Each additional layered graph may include a randomly arranged first layer. In some embodiments, each layer of the additional initial layered graph is iteratively generated therefrom. Alternatively or additionally, in some embodiments, the initial layered graph is otherwise randomly and/or programmatically generated utilizing one or more algorithms for determining initial node placement within each layer. In this regard, each additional layered graph may be associated with differently positioned nodes and edges.

At operation 1404, the apparatus 300 includes means, such as the qubit positioning circuitry 310, the communications circuitry 308, the input/output circuitry 306, the processor 302, and/or the like, or a combination thereof, to generate an additional possible efficient layered graph for each additional initial layered graph. In some embodiments, the apparatus 300 generates each additional possible efficient layered graph by transforming each additional initial layered graph utilizing the graph processing algorithm. Based on the differing node and edge configuration of each initial layered graph, it should be appreciated that each initial layered graph thus may yield a different corresponding efficient layered graph. Each possible efficient layered graph may represent the best (e.g., minimized) cost function resulting from processing of the initial layered graph via the graph processing algorithm.

At operation 1406, the apparatus 300 includes means, such as the qubit positioning circuitry 310, the communications circuitry 308, the input/output circuitry 306, the processor 302, and/or the like, or a combination thereof, to select the efficient layered graph from each possible efficient layered graph. The efficient layered graph selected by the apparatus 300 may represent the possible efficient layered graph that yields the best (e.g., total minimized) cost of all cost functions performed for the total set of possible efficient layered graphs. In this regard, the apparatus 300 may track the cost for each additional possible efficient layered graph as execution of the graph processing algorithm is completed. The apparatus 300 may thus select the efficient layered graph tracked as associated with the lowest total cost upon completion of processing all the possible efficient layered graphs. Alternatively or additionally, in some embodiments, the apparatus 300 generates all additional possible efficient layered graphs, and then determines and compares the cost associated with each utilizing a particular cost function, and selects the efficient layered graph associated with the lowest cost.

FIG. 15 illustrates additional operations for implementing slide command(s) of an example process for improved global qubit placement in accordance with at least some example embodiments of the present disclosure. Specifically, FIG. 15 depicts operations of an example process 1500 for performing one or more slide command(s). In some embodiments, the process 1500 is embodied by computer program code stored on a non-transitory computer-readable storage medium of a computer program product configured for execution to perform the process as depicted and described. Alternatively or additionally, in some embodiments, the process 1500 is performed by one or more specially configured computing devices, such as the apparatus 300 alone or in communication with one or more other component(s), device(s), system(s), and/or the like. In this regard, in some such embodiments, the apparatus 300 is specially configured by computer-coded instructions (e.g., computer program instructions) stored thereon, for example in the memory 304 and/or another component depicted and/or described herein and/or otherwise accessible to the apparatus 300, for performing the operations as depicted and described. In some embodiments, the apparatus 300 is in communication with one or more external apparatus(es), system(s), device(s), and/or the like, to perform one or more of the operations as depicted and described. For purposes of simplifying the description, the process 1500 is described as performed by and from the perspective of the apparatus 300.

The process 1500 begins at operation 1502. In some embodiments, the process 1500 begins after one or more operations depicted and/or described with respect to any of the other processes described herein. For example, in some embodiments as depicted, the process 1400 begins after execution of operation 1308. In this regard, some or all of the process 1500 may replace or supplement one or more blocks depicted and/or described with respect to any of the other processes described herein. For example, in some embodiments as depicted, the process 1500 supplants, supplements, and/or otherwise replaces the operation 1308. Additionally or alternatively, as depicted, upon completion of the process 1500, flow may return to one or more operations of another process. For example, as depicted, flow may return to operation 1310 as depicted and described.

At operation 1502, the apparatus 300 includes means, such as the qubit positioning circuitry 310, the communications circuitry 308, the input/output circuitry 306, the processor 302, and/or the like, or a combination thereof, to determine a parallel swap command set from the efficient layered graph. The parallel swap command set may include one or more operations (e.g., swap operations) that position the qubits for gating at one or more time steps. For example, in some embodiments the parallel swap command set corresponds to swap operations determined via even-odd transposition sort for positioning the qubits to new target positions. The parallel swap command set may be generated as though all positions in a quantum computing environment are usable for gating.

At operation 1504, the apparatus 300 includes means, such as the qubit positioning circuitry 310, the communications circuitry 308, the input/output circuitry 306, the processor 302, and/or the like, or a combination thereof, to insert at least one slide command into the parallel swap command set. The at least one slide command may be inserted based at least in part on a number of gate zones associated with the quantum computing environment and a number of qubits in the qubit set to be positioned. For example, in this regard, the one or more slide commands may be inserted upon determination that the number of qubits exceeds twice the number of gate zones of the quantum computing environment. In this regard, the one or more slide commands may be inserted into the parallel swap command set such that each qubit is repositioned to a subsequent position in a particular direction after performing one or more steps of parallel gate operations. In this regard, any number of slide command(s) may be inserted for each time step before subsequent parallel gating operations to ensure that each qubit that is utilized for a particular gating operation at the current time slice is positioned with its associated adjacent qubit for gating (if paired) before the qubits are rearranged in accordance with a subsequent layer.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory having computer-coded instructions stored thereon that, in execution with the at least one processor, configure the apparatus to:

identify a qubit grouping set representing a quantum program associated with a qubit set;

generate an initial layered graph comprising a node set and an edge set arranged into one or more layers representing one or more time slices, wherein each node of the node set represents a qubit group of the qubit grouping set, wherein each edge of the edge set connects a first node in a first layer of the one or more layers to a second node in a second layer of the one or more layers, the first node comprising at least one qubit index shared with the second node;

generate an efficient layered graph by transforming the initial layered graph utilizing a graph processing algorithm, wherein the graph processing algorithm reduces a number of edge crossings in the initial layered graph;

determine a qubit position arrangement for the qubit set based at least in part on the efficient layered graph; and reposition the qubit set within a quantum computing environment by executing a set of qubit manipulation instructions using the determined qubit position arrangement.

2. The apparatus according to claim 1, wherein the graph processing algorithm comprises a Sugiyama algorithm implementation.

3. The apparatus according to claim 1, wherein the graph processing algorithm utilizes a barycenter heuristic to rearrange a subset of nodes at each layer of the one or more layers.

4. The apparatus according to claim 1, wherein the graph processing algorithm utilizes a randomized component to rank each node.

5. The apparatus according to claim 1, wherein the graph processing algorithm implements a cost function that minimizes a number of required parallel swap time steps as a primary cost factor and the cost function minimizes a number of swap operations as a secondary cost factor.

6. The apparatus according to claim 1, wherein to generate the efficient layered graph, the apparatus is configured to:

generate at least one additional initial layered graph, each additional initial layered graph comprising a randomly arranged first layer;

generate an additional possible efficient layered graph for each additional initial layered graph by transforming each additional initial layered graph utilizing the graph processing algorithm; and select the efficient layered graph from each additional possible efficient layered graph.

7. The apparatus according to claim 1, the apparatus further configured to:

determine a parallel swap command set from the efficient layered graph; and insert into the parallel swap command set at least one slide command based at least in part on a number of gate zones associated with a quantum computing environment and a number of qubits in the qubit set.

8. The apparatus according to claim 1, wherein the graph processing algorithm performs graph squeezing based at least in part on a qubit gating positions set.

9. The apparatus according to claim 1, wherein the initial layered graph comprises a two-dimensional layered graph representing a linear quantum computing environment.

10. The apparatus according to claim 1, wherein the initial layered graph comprises a three-dimensional layered graph representing a loop quantum computing environment.

11. A computer-implemented method comprising:

identifying a qubit grouping set representing a quantum program associated with a qubit set;

generating an initial layered graph comprising a node set and an edge set arranged into one or more layers representing one or more time slices, wherein each node of the node set represents a qubit group of the qubit grouping set, wherein each edge of the edge set connects a first node in a first layer of the one or more layers to a second node in a second layer of the one or more layers, the first node comprising at least one qubit index shared with the second node;

generating an efficient layered graph by transforming the initial layered graph utilizing a graph processing algorithm, wherein the graph processing algorithm reduces a number of edge crossings in the initial layered graph;

determining a qubit position arrangement for the qubit set based at least in part on the efficient layered graph; and repositioning the qubit set within a quantum computing environment by executing a set of qubit manipulation instructions using the determined qubit position arrangement.

12. The computer-implemented method according to claim 11, wherein the graph processing algorithm comprises a Sugiyama algorithm implementation.

13. The computer-implemented method according to claim 11, wherein the graph processing algorithm utilizes a barycenter heuristic to rearrange a subset of nodes at each layer of the one or more layers.

14. The computer-implemented method according to claim 11, wherein the graph processing algorithm utilizes a randomized component to rank each node.

15. The computer-implemented method according to claim 11, wherein the graph processing algorithm implements a cost function that minimizes a number of required parallel swap time steps as a primary cost factor and the cost function minimizes a number of swap operations as a secondary cost factor.

16. The computer-implemented method according to claim 11, wherein generating the efficient layered graph further comprises:

generating at least one additional initial layered graph, each additional initial layered graph comprising a randomly arranged first layer;

generating an additional possible efficient layered graph for each additional initial layered graph by transforming each additional initial layered graph utilizing the graph processing algorithm; and selecting the efficient layered graph from each additional possible efficient layered graph.

17. The computer-implemented method according to claim 11, the computer-implemented method further comprising:

determining a parallel swap command set from the efficient layered graph; and inserting into the parallel swap command set at least one slide command based at least in part on a number of gate zones associated with a quantum computing environment and a number of qubits in the qubit set.

18. A computer program product comprising at least one non transitory computer-readable storage medium having computer program code stored thereon that, in execution with at least one processor, is configured for:

identifying a qubit grouping set representing a quantum program associated with a qubit set;

generating an initial layered graph comprising a node set and an edge set arranged into one or more layers representing one or more time slices, wherein each node of the node set represents a qubit group of the qubit grouping set, wherein each edge of the edge set connects a first node in a first layer of the one or more layers to a second node in a second layer of the one or more layers, the first node comprising at least one qubit index shared with the second node;

generating an efficient layered graph by transforming the initial layered graph utilizing a graph processing algorithm, wherein the graph processing algorithm reduces a number of edge crossings in the initial layered graph;

determining a qubit position arrangement for the qubit set based at least in part on the efficient layered graph; and repositioning the qubit set within a quantum computing environment by executing a set of qubit manipulation instructions using the determined qubit position arrangement.

19. The computer program product according to claim 18, wherein generating the efficient layered graph comprises:

generating at least one additional initial layered graph, each additional initial layered graph comprising a randomly arranged first layer;

generating an additional possible efficient layered graph for each additional initial layered graph by transforming each additional initial layered graph utilizing the graph processing algorithm; and selecting the efficient layered graph from each additional possible efficient layered graph.

20. The computer program product according to claim 18, wherein at least one of:

the graph processing algorithm comprises a Sugiyama algorithm implementation, the graph processing algorithm utilizes a barycenter heuristic to rearrange a subset of nodes at each layer of the one or more layers, the graph processing algorithm utilizes a randomized component to rank each node, or the graph processing algorithm implements a cost function that minimizes a number of required parallel swap time steps as a primary cost factor and the cost function minimizes a number of swap operations as a secondary cost factor.

* * * * *